United States Patent
Takashima et al.

(10) Patent No.: US 6,247,568 B1
(45) Date of Patent: Jun. 19, 2001

(54) FRICTION MEMBER FOR DISK ASSEMBLY, ESPECIALLY FOR TORQUE CONVERTER

(75) Inventors: Hiroshi Takashima, Shijonawate; Yoshihiro Matsuoka, Neyagawa, both of (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 09/457,298

(22) Filed: Dec. 9, 1999

(30) Foreign Application Priority Data

Dec. 25, 1998 (JP) .................................................. 10-369804
Dec. 3, 1999 (JP) .................................................. 11-066027

(51) Int. Cl.$^7$ ...................................................... F16D 13/72
(52) U.S. Cl. ................. 192/70.12; 192/3.29; 192/113.36
(58) Field of Search ................................ 192/3.28, 3.29, 192/70.12, 113.1, 113.3, 113.34, 113.36

(56) References Cited

U.S. PATENT DOCUMENTS

| | | | |
|---|---|---|---|
| 5,094,331 | * 3/1992 | Fujimoto et al. | 192/70.12 |
| 5,460,255 | * 10/1995 | Quigley | 192/113.36 |
| 5,566,802 | * 10/1996 | Kirkwook | 192/3.29 |
| 5,605,210 | * 2/1997 | Koike et al. | 192/3.29 |
| 5,669,474 | * 9/1997 | Dehrmann et al. | 192/3.29 |
| 5,839,182 | 11/1998 | Maruta et al. | 29/464 |
| 5,848,937 | 12/1998 | Mizukami et al. | 464/64 |
| 5,857,551 | 1/1999 | Yoneda | 192/107 C |
| 5,857,552 | 1/1999 | Hashimoto | 192/213.21 |
| 5,918,713 | 7/1999 | Shimizu et al. | 192/3.29 |
| 5,934,435 | * 8/1999 | Bauer | 192/113.34 |
| 5,954,172 | 9/1999 | Mori | 192/3.29 |
| 5,964,329 | 10/1999 | Kawaguchi et al. | 192/3.3 |
| 5,979,621 | * 11/1999 | Schoder | 192/3.29 |
| 6,000,510 | * 12/1999 | Kirkwood et al. | 192/3.29 |

* cited by examiner

Primary Examiner—Charles A Marmor
Assistant Examiner—Saúl Rodriguez
(74) Attorney, Agent, or Firm—Shinjyu Global IP Counselors, LLP

(57) ABSTRACT

A friction member has a pair of friction facings 46a and 46b that are designed to reduce drag torque during operation in a fluid filled chamber. The friction member has a circular friction plate 43 with an aperture at its center and the friction facings 46a and 46b are coupled thereto. The friction member can be part of a lock-up device 4 of a torque converter 1 or a part of a power cut-off clutch 102 of a torque converter. The friction member has a first friction facing 46a that is formed of an annular and flat main body. The main body has a first surface fixedly coupled to the friction plate 43 and a second surface on the opposite side with a plurality of grooves 81. The grooves 81 extend through from the inner periphery to the outer periphery and having bent portions 83 and 85 at a middle area. In another embodiment, a friction member is provided with friction facings 141 and 142 with center apertures, which are rotatable in a fluid chamber around a central axis to suppress lowering of fluid pressure due to rotation. The annular friction surfaces of the facings 141 and 142 are provided with a plurality of grooves 190. Each of the grooves 190 extends from the inner periphery to the outer periphery and has a bent portion at a middle area. The bent portion of the groove 190 is formed of radially outer and inner grooves and has a V-shaped opening in the rotating direction of the friction facings. The bent portion prohibits the rapid flow of fluid through the groove. Consequently, lowering of the fluid pressure can be suppressed.

52 Claims, 13 Drawing Sheets

FRICTION MEMBER FOR DISK ASSEMBLY, ESPECIALLY FOR TORQUE CONVERTER

BACKGROUND OF THE INVENTION

1. Field of the Invention

This invention generally relates to a friction member having a circular plate-like form with an aperture at its center, and is rotatable around its central axis. More specifically, the present invention relates to a friction disk that operates in a fluid chamber filled with fluid, such as a torque converter. Specifically, the friction disk is part of a disk assembly for transmitting a torque from an input rotary member to an output rotary member in a torque converter.

2. Background Information

In general, a torque converter transmits power via fluid, and therefore can facilitate smooth acceleration and deceleration. However, slinging of fluid results in energy losses and therefore low fuel efficiency.

A certain type of torque converter in the prior art is provided with a lock-up device for mechanically coupling a front cover on the input side to a turbine on the output side. The lock-up device is arranged in a space between the front cover and the turbine. The lock-up device is primarily formed of a circular plate-like piston, which can be pressed against the front cover, a driven plate, which is attached to a rear side of the turbine, and torsion springs for elastically coupling the piston and the driven plate together in the rotating direction. The piston has a circular and annular friction member which is fixed by adhesion to a portion of the piston opposed to the flat friction surface of the front cover.

In the conventional lock-up device, the operation of the piston is controlled by a working fluid or oil, which flows within a main unit of the torque converter. More specifically, the working fluid is supplied from an external hydraulic operation mechanism into a region between the piston and the front cover when the lock-up is released. This working fluid flows radially outward in the space between the front cover and the piston, and flows into the main unit of the torque converter through its radially outer portion. When the lock-up is engaged, the working fluid in the space between the front cover and the piston is drained through the radially inner side so that the piston moves toward the front cover. As a result, the friction member provided on the piston is pressed against the friction surface of the front cover. In this manner, a torque of the front cover is transmitted to the turbine side via the lock-up device.

In the conventional lock-up device, a multiple-disk clutch, which is provided with a plurality of friction plates for providing a plurality of friction surface is used for ensuring a sufficiently large torque transmission capacity.

A certain type of conventional lock-up device of the torque converter provided with the multiple-disk clutch may have, e.g., a clutch coupling portion, which includes a driven plate and drive plates arranged on the opposite sides thereof. The driven plate carries wet friction facings, which are fixedly coupled to its opposite sides for forming friction surfaces with respect to the respective drive plates. The clutch coupling portion of the multiple-disk type having such multiple friction surfaces may suffer from a problem relating to a drag torque. The drag torque is a torque which occurs due to contact between the drive and driven plates in the clutch released state.

The torque converter includes a front cover supplied with a torque of an engine, an impeller which is arranged on a transmission side with respect to the front cover for forming a fluid chamber together with the front cover, a turbine which is arranged in the fluid chamber and is opposed to the impeller to form a fluid operation chamber together with the impeller, a stator arranged radially inside the impeller and the turbine for regulating a flow of the fluid from the turbine to the impeller, and a power cut-off clutch which is arranged between the front cover and the turbine for transmitting and interrupting the torque from the turbine to the transmission.

The power cut-off clutch includes a pair of drive plates coupled to an engine, a piston for driving a pair of drive plates, a circular driven plate for rotation around a central axis, and a pair of friction facings fixedly coupled to axially opposite surfaces of the driven plate, respectively. The paired drive plates are coupled to the turbine, and can hold the driven plate and the paired friction facings from the axially opposite sides. The driven plate is coupled to the transmission.

The paired friction facings are made of circular plate-like members, each of which has a central aperture and is rotatable around the central axis. Each of the paired friction facings is provided on its surface, which is not fixedly coupled to the driven plate, with a plurality of grooves. As shown in FIG. 15, these plurality of grooves are formed of a plurality of grooves extending in a first direction parallel to a certain diametral direction and a plurality of grooves extending in a second direction perpendicular to the first direction.

When the torque converter operates, the fluid in the fluid chamber is moved radially outward by a centrifugal force. In this operation, the speed of the fluid flowing between the paired drive plates and the driven plate is lower than that of the fluid flowing between the front cover and the drive plate on the engine side. In particular, when the surfaces of the friction facings fixedly coupled to the axially opposite surfaces of the driven plate are parallel to the direction of the fluid flow, the fluid flows radially outward through the grooves provided on the contact surface.

When the engaged clutch is released, the fluid pressure on the transmission side of the piston lowers so that the piston and the drive plate neighbouring the piston are spaced from the other drive plate and the driven plate. In this operation, the speed of the fluid flowing between the paired drive plates and the driven plate is larger than the speed of the fluid flowing between the drive plate on the engine side and the front cover, and is also larger than the speed of the fluid flowing on the transmission side of the piston. Therefore, the pressure of the fluid flowing between the paired drive plates and the driven plate is low. As a result, the paired drive plates are pulled toward the driven plate so that the clutch cannot be released sufficiently, and a drag torque is transmitted to the transmission.

In view of the above, there exists a need for friction member which overcomes the above mentioned problems in the prior art. This invention addresses this need in the prior art as well as other needs, which will become apparent to those skilled in the art from this disclosure.

SUMMARY OF THE INVENTION

An object of the invention is to reduce drag in a wet clutch such as a lock-up device of a torque converter.

According to a first aspect, the invention provides a wet friction member to be fixedly coupled to a friction plate of a wet clutch. The wet friction member is formed of an annular and flat main body. The main body has a first surface fixedly coupled to the friction plate, a second surface on the opposite side, and a plurality of grooves formed on the second surface, extending through from an inner periphery of the second surface to an outer periphery of the second surface and each having an even number of bent portions.

In the clutch released state, the friction member rotates relatively to a neighbouring member. Therefore, the fluid flows through a plurality of grooves formed on the surface of the wet friction member, and a collision or the like occurs between different fluid flows in the bent portion and/or between the fluid flow and the bent wall so that a resistance occurs, and the pressure rises in the bent portion. Thus, a dynamic pressure occurs between the wet friction member and the other member, and the friction plate tends to move away from the other member. This reduces drag torque.

In this structure employing the wet friction members according to the invention on the opposite sides of the friction plate, respectively, each groove has bent portions, which are even in number. Therefore, the bent portion(s) in which the collision of fluid occurs on one of the axially opposite sides are equal in number to those on the other side. As a result, the dynamic pressures which occur on the axially opposite sides of the friction member are equal to each other so that the friction plate can keep a predetermined axial position.

According to a second aspect of the present invention, the wet friction member according to the first aspect further has such a feature that each of the grooves has two bent portions.

According to a third aspect of the present invention, the wet friction member according to the second aspect further has such a feature that each groove has a first groove portion extending radially inward from the outer periphery, a second groove portion extending radially outward from the inner periphery and a third groove portion connecting the first and second groove portions together to form the bent portions in portions connected to the first and second groove portions, respectively.

In the structure where the wet friction members are fixedly coupled to the opposite surfaces of the friction plate, the collision between flows of fluid on one of the wet friction member occurs in the bent portion formed by the first and third groove portions, and the collision between flows of fluid on the other wet friction member occurs in the bent portion formed by the second and third groove portions. As a result, substantially equal dynamic pressures occur on the opposite sides of the friction plate, respectively.

According to a fourth aspect of the present invention, the wet friction member according to the third aspect further has such a feature that the radially outer end of the first groove portion and the radially inner end of the second groove portion are substantially located in the circumferentially same position, and the radially inner end of the first groove portion and the radially outer end of the second groove portion are located in the circumferentially different positions, respectively.

According to this wet friction member, the radially inner and outer ends of the first groove portion are in the circumferentially different positions, respectively, and the radially inner and outer ends of the second groove portion are in the circumferentially different positions, respectively. Therefore, at least one of the grooves is opened in the rotating direction. Therefore, the flow rate of the fluid flowing into the groove increases, which improves the pressure holding effect.

According to a fifth aspect of the present invention, the wet friction member according to the third aspect further has such a feature that the first and second groove portions extend substantially radially in circumferentially different positions, respectively, and the third groove portion extends substantially in the circumferential direction.

In this wet friction member, since the third groove extends substantially in the circumferential direction, the groove portions can be arranged over a wide range without requiring bending of the respective groove portions at an acute angle. Since it is possible to increase the area of the grooves on the surface of the friction member, the cooling effect is increased.

According to a sixth aspect of the present invention, the invention provides a friction disk to be used in a wet clutch, including a friction plate and wet friction members. The friction plate has an annular frictional coupling portion. The wet friction members are formed of a pair of members fixedly coupled to the opposite surfaces of the frictional coupling portion, respectively. The wet friction members are the same as that recited in any one of the preceding first to fifth aspects.

Another object of the invention is to suppress lowering of the fluid pressure, which may occur due to rotation of a circular plate-like friction member in a fluid chamber.

According to a seventh aspect of the present invention, a friction member assembly is provided, which includes the foregoing friction member and a plate connected to the friction member, and is arranged in a fluid chamber.

According to eighth aspect of the present invention, a disk assembly for transmitting a torque from an input rotary member to an output rotary member, particularly a disk assembly including the foregoing friction member assembly, is provided.

According to a ninth aspect of the present invention, a torque converter for transmitting a torque from an input rotary member to an output rotary member, particularly a torque converter including the foregoing disk assembly, is provided.

According to a tenth aspect of the present invention, a friction member has an aperture at its center, is rotatable around a central axis and has a circular plate-like form. At least one of axially opposite surfaces of the friction member is provided with a plurality of grooves extending through from an inner periphery of the surface to an outer periphery of the same, and having a bent portion at its radially middle portion.

According to an eleventh aspect of the present invention, the friction member according to the tenth aspect further has a feature that the bent portion of the groove is a bent portion.

According to a twelfth aspect of the present invention, the friction member according to the eleventh aspect further has a feature that the groove has a V-shaped form opened in the rotating direction of the friction member.

According to a thirteenth aspect of the present invention, the invention provides a friction member assembly to be arranged in a fluid chamber filled with a fluid. The friction member assembly includes a circular plate and a first friction facing formed of the friction member of the tenth, eleventh, or twelfth aspect. The circular plate rotates around a central axis in the fluid chamber. The first friction facing is fixedly coupled to at least one of the axially opposite surfaces of the outer peripheral portion of the plate.

According to a fourteenth aspect of the present invention, the friction member assembly according to the thirteenth aspect has a feature that the assembly further includes a second friction facing fixedly coupled to the other of the axially opposite surfaces of the outer peripheral portion of the plate and formed of the friction member as recited in the tenth, eleventh, or twelfth aspect.

A disk assembly according to a fifteenth aspect of the present invention is an assembly for transmitting a torque from an input rotary member to an output rotary member. The disk assembly includes a friction member assembly recited in the thirteenth or fourteenth aspect, a pinching mechanism for pinching the friction member assembly from the axially opposite sides, and a drive mechanism for driving the pinching mechanism. The friction member assembly is coupled to one of the input and output rotary members, and the pinching mechanism is coupled to the other of the input and output rotary members.

A torque converter of a sixteenth aspect of the present invention is a torque 1 converter for transmitting a torque from an input rotary member to an output rotary member. The torque converter includes a front cover supplied with a torque from the input rotary member, an impeller, a turbine, a stator, and a power cut-off clutch. The impeller is arranged on the output rotary member side of the front cover, and forms a fluid chamber together with the front cover. The turbine is arranged in the fluid chamber, is opposed to the impeller and forms a fluid operation chamber together with the impeller. The stator is arranged radially inside the impeller and the turbine, and regulates a flow of fluid from the turbine to the impeller. The power cut-off clutch is arranged axially between the front cover and the turbine, and can transmit and interrupt the torque from the turbine to the output rotary member. The power cut-off clutch includes the disk assembly recited in the sixth aspect. The pinching mechanism is coupled to the turbine, and the plate is coupled to the output rotary member.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
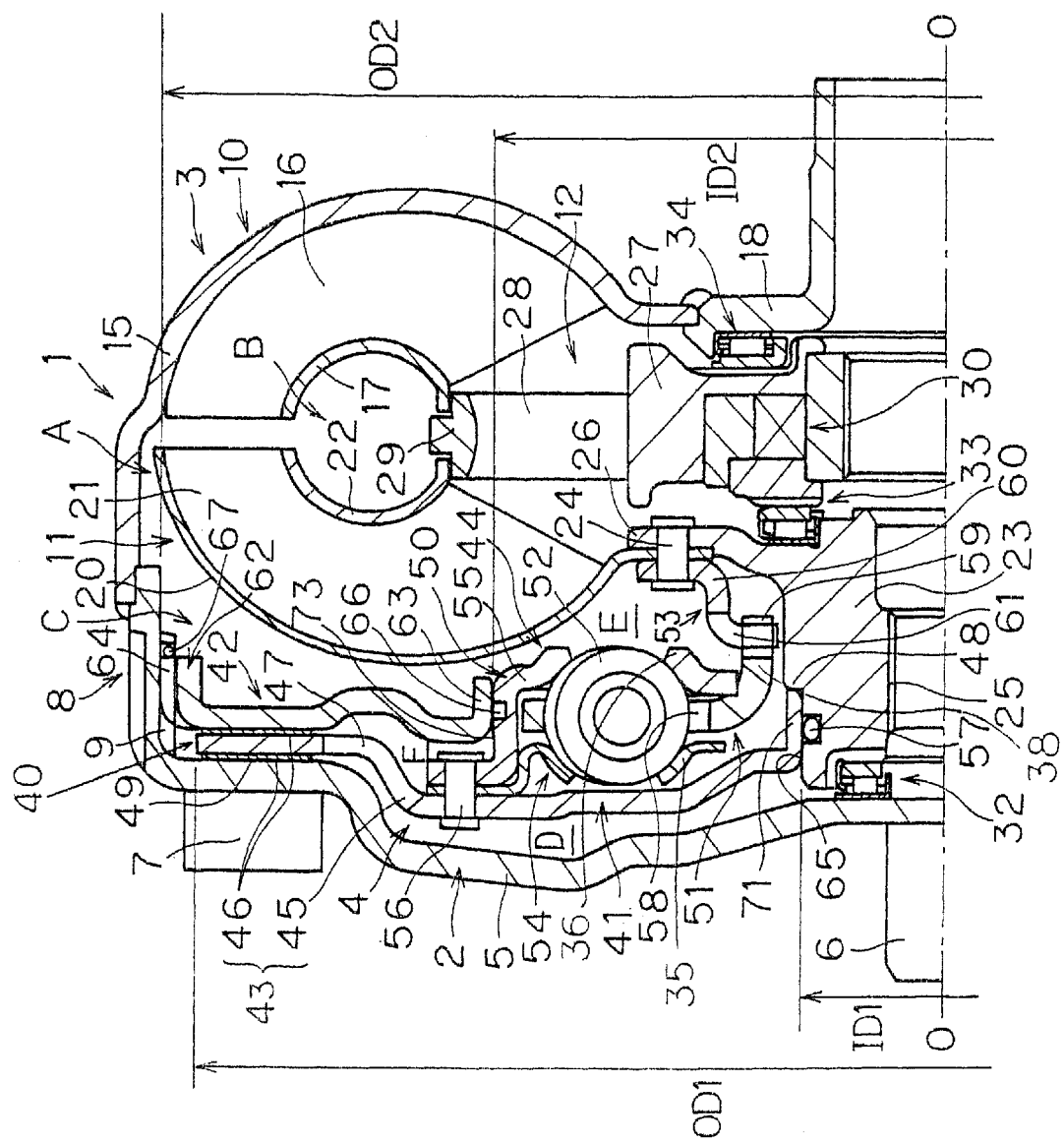
FIG. 1 is a schematic cross sectional view of a torque converter employing a friction member in the lock-up clutch of a first embodiment of the present invention.

FIG. 1 shows a torque converter 1 employing an embodiment of the invention. As seen in FIG. 1, the torque converter 1 is primarily formed of a front cover 2, a fluid operating portion 3 formed of three kinds of vane wheels and a lock-up device 4. The lock-up device 4 is arranged in a space C, which is, formed axially between the front cover 2 and the turbine 11. The impeller 10, the turbine 11 and the stator 12 are coaxial with the front cover 2. The front cover 2 and an impeller shell 15 of the impeller 10 are welded together at their outer peripheral portions to form a fluid chamber A filled with a working fluid. In the impeller shell 15, a portion extending beyond the impeller blades 16 is arranged radially outside the turbine 11, and is integral with the outer cylindrical portion 8 of the front cover 2.

The front cover 2 is a member receiving a torque from a crankshaft (not shown) of an engine. The front cover 2 is primarily formed of a circular plate-like main body 5. The center of the main body 5 is fixedly coupled to a boss 6. The main body 5 has a plurality of nuts 7 fixedly coupled to a surface, on the engine side, of the outer peripheral portion of the main body 5. The outer cylindrical portion 8 extending toward the transmission is formed on the outer periphery of the main body 5. The outer cylindrical portion 8 is provided at its entire circumference with irregularities (i.e., concave and convex portions) which project radially from alternate positions. These irregularities form a lug or spline 9 on the inner periphery of the outer cylindrical portion 8. Further, an annular and flat friction surface 70 is formed on the axially inner side of the radially outer portion of the main body 5 of the front cover 2. The friction surface 70 is directed axially toward the transmission.

The fluid operation portion 3 is arranged in the fluid chamber A, and is located on the transmission side in the axial direction. Thereby, the fluid chamber A is divided into a fluid operation chamber B formed of the fluid operation portion 3, and a space C defined between the main body 5 of the front cover 2 and the turbine 11.

The impeller 10 is formed of the impeller shell 15, the plurality of impeller blades 16, an impeller core 17 and an impeller hub 18. The plurality of impeller blades 16 is fixedly coupled to the inner side of the impeller shell 15. The impeller core 17 is fixedly coupled to the inner side of the impeller blade 16. The impeller hub 18 is fixedly coupled to the inner periphery of the impeller shell 15.

The turbine 11 is arranged in the fluid chamber A, and is opposed to the impeller 10. The turbine 11 is formed of a turbine shell 20, a plurality of turbine blades 21, a turbine core 22 and a turbine hub 23. The turbine blades 21 are fixedly coupled to the turbine shell 20. The turbine core 22 is fixedly coupled to the inner sides of the turbine blades. The turbine hub 23 is fixedly coupled to the inner periphery of the turbine shell 20. The turbine hub 23 is a cylindrical member with a radial flange 26 extending therefrom. The flange 26 is fixedly coupled to the inner peripheral portion of the turbine shell 20 by a plurality of rivets 24. Further, the turbine hub 23 is provided at its inner periphery with a spline 25. The spline is engaged with a shaft (not shown) extending from the transmission. Thereby, the torque is transmitted from the turbine hub 23 to the shaft (not shown).

The stator 12 is arranged between the inner peripheral portion of the impeller and the inner peripheral portion of the turbine 11. The stator 12 is a mechanism for regulating the flow of working fluid returning from the turbine 11 to the impeller 10. The stator 12 is formed of a stator carrier 27, a plurality of stator blades 28 and a stator core 29. The stator blades 28 are fixedly coupled to the outer peripheral surface of the stator carrier 27. The stator core 29 is fixedly coupled to the inner sides of the stator blades 28. The stator carrier 27 is supported on a fixed shaft (not shown) via a one-way clutch 30.

A first thrust bearing 32 is arranged axially between the main body 5 of the front cover 2 and the turbine hub 23. The turbine hub 23 is provided at its end surface on the engine side with a plurality of radial grooves, which allow the working fluid to flow on the radially opposite sides of the first thrust bearing 32. A second thrust bearing 33 is arranged between the turbine hub 23 and the one-way clutch 30. A member forming the one-way clutch 30 is provided on the engine side with a plurality of radial grooves. These grooves allow flow of the working fluid between the radially opposite sides of the second thrust bearing 33. A third thrust bearing 34 is arranged axially between the stator carrier 37 and the impeller hub 18. The stator carrier 37 is provided at its transmission side with a plurality of radial grooves. These grooves allow flow of the working fluid between the radially opposite sides of the third thrust bearing 34.

In this embodiment, a first oil passage of the hydraulic operation mechanism is connected to a position defined axially between the impeller hub 18 and the stator 12. A second oil passage of the hydraulic operation mechanism is connected to a position defined axially between the stator 12 and the turbine hub 23. A third oil passage of the hydraulic operation mechanism is connected to a position defined axially between the turbine hub 23 and the front cover 2. Usually, the first and second oil passages are connected to a commonly hydraulic circuit, and both operate to supply or discharge the working fluid to or from the fluid operating portion 3. The third oil passage 3 is formed within the shaft, and can operate to supply the working fluid to the space between the front cover 2 and the turbine hub 23, i.e., the inner peripheral portion of the space C, and to discharge the working fluid from the space C.

The space C is now described. The space C is an annular space formed axially between the main body 5 of the front cover 2 and the turbine 11. The engine side in the axial direction of the space C is defined by the main body 5 of the front cover 2, and the transmission side thereof is defined by the turbine shell 20 of the turbine 11. The outer periphery of the space C is primarily defined by the inner peripheral surface of the outer cylindrical portion 8, and the inner periphery thereof is defined by the outer peripheral surface of the turbine hub 23. The space C is coupled, as described above, to an external hydraulic operation mechanism via its inner peripheral portion which is a space between the inner peripheral portion of the front cover 2 and the turbine hub 23. The space C is communicated at its outer peripheral portion to the fluid operation chamber B via a space between the outlet of the impeller 10 and the inlet of the turbine 11.

The lock-up device 4 is arranged within the space C. The lock-up device 4 is configured to couple and release the front cover 2 with respect to the turbine 11 in a mechanical manner by utilizing changes in hydraulic pressure in the space C. The lock-up device 4 is primarily formed of a piston mechanism 41 and a piston 42.

The piston mechanism 41 has a piston function for operating by itself in accordance with change in hydraulic pressure in the space C, and a damper mechanism for absorbing and damping torsional vibrations in the rotating direction.

The piston mechanism 41 is formed of a first piston 43 and a damper mechanism 44. The first piston 43 is a circular plate-like member arranged on the side near the main body 5 of the front cover 2. The first piston 43 is primarily formed of a circular plate 45, which divides the space C into a first space D on the front cover 2 side and a second space E on the turbine 11 side. The outer peripheral portion of the plate 45 forms a first frictional coupling portion 49, which is arranged on the transmission side with respect to the friction surface 70 of the front cover 2. The first frictional coupling portion 49 is an annular flat portion having a plate-like form, and carries annular friction members 46 which are fixedly coupled to its axially opposite sides, respectively. The friction member 46 opposed to the friction surface 70 is referred to as a first friction member 46a, and the friction member 46 on the opposite side is referred to as a second friction member 46b. The plate 45 is provided at its inner periphery with an inner cylindrical portion 71. The inner cylindrical portion 71 extends axially toward the transmission from the inner periphery of the plate 45. The inner peripheral surface of the inner cylindrical portion 71 is supported by the outer peripheral surface 65 of the turbine hub 23. The inner peripheral surface of the inner cylindrical portion 71 is movable in both the axial and rotational directions with respect to the outer peripheral surface 65. The turbine hub 23 is provided at its outer peripheral surface with an annular contact portion 48, which is located on the transmission side with respect to the inner cylindrical portion 71. This structure restricts the axial movement of the plate 45 toward the transmission. The outer peripheral surface 65 is provided with an annular groove, in which a seal ring 57 is arranged. The seal ring 57 is in contact with the inner peripheral surface of the inner cylindrical portion 71. This seal ring 57 provides a seal between the first and second spaces D and E.

As described above, the third oil passage is communicated with the inner peripheral portion of the first space D, and is intercepted from the second space E by the inner periphery of the first piston 43 and the outer peripheral surface 65 of the turbine hub 23. The outer peripheral portion is intercepted from the second space E when the first frictional coupling portion 49 is in contact with the friction surface 70, and is communicated with the second space E when the portion 49 is spaced from the friction surface 70.

Figure 3:
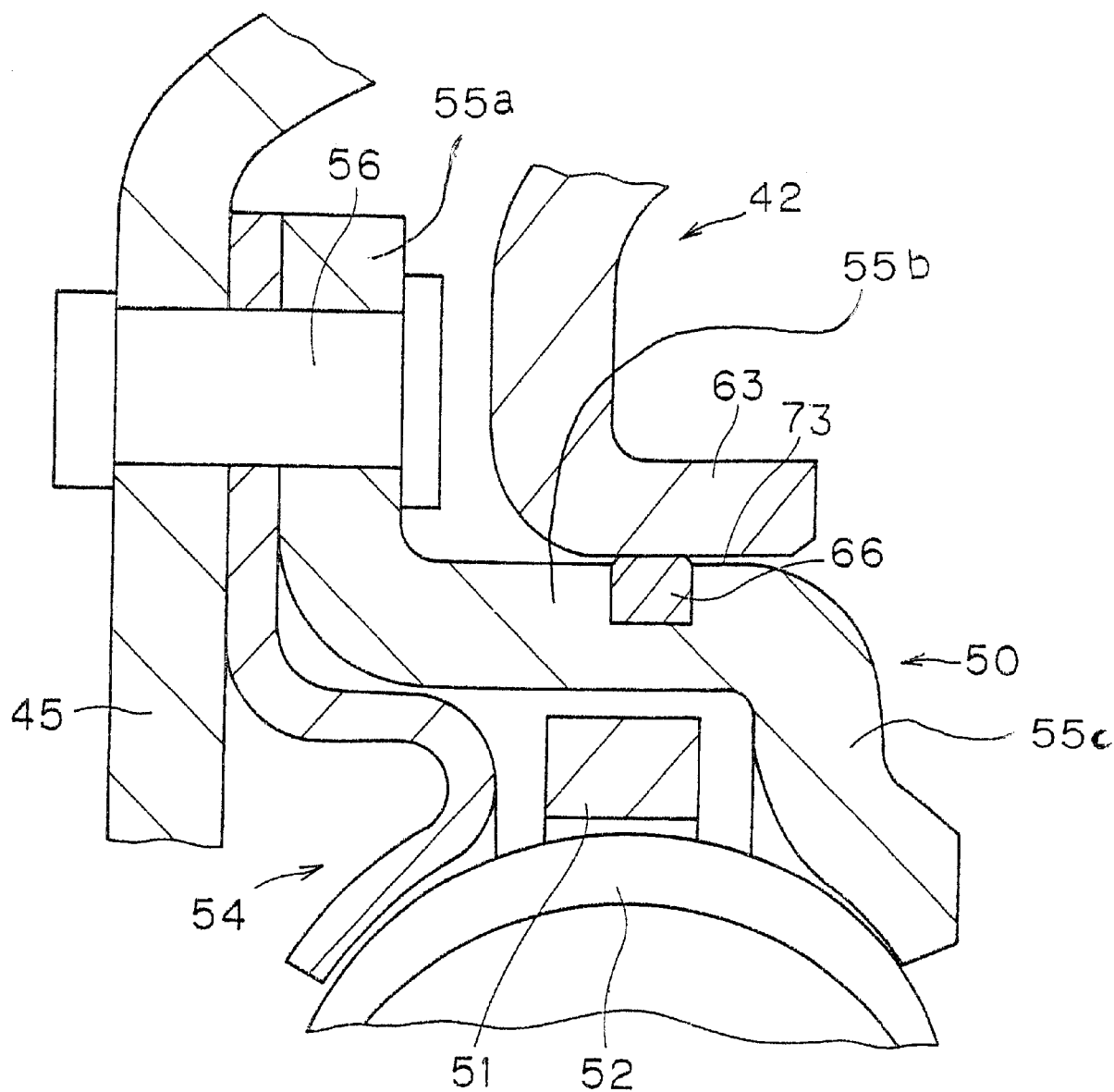
FIG. 3 is an enlarged, partial schematic cross sectional view of a structure for supporting a piston by a damper mechanism.

The damper mechanism 44 is a mechanism for transmitting the torque of the first piston 43 toward the turbine 11 and for absorbing and damping torsional vibrations. The damper mechanism 44 is arranged in the second space E, and is arranged between the inner peripheral portions of the first piston 43 and the turbine shell 20. The damper mechanism 44 is primarily formed of a drive member 50, a driven member 51 and torsion springs 52. The drive member 50 is firmly fixedly coupled to the first piston 43. The driven member 51 can send the torque to the turbine 11. The torsion springs 52 elastically couple the drive and driven members 50 and 51 together in the rotating direction. More specifically, the drive member 50 is formed of a first drive plate 54 and a second drive plate 55. The drive plates 54 and 55 are annular members that are aligned in the axial direction. The first drive plate 54 is arranged close to the transmission side of the plate 45 of the first piston 43. The second drive plate 55 is arranged on the transmission side of the first drive plate 54. The outer peripheral portions of the drive plates 54 and 55 are fixedly coupled to the first piston 43 by a plurality of rivets 56. The inner peripheral portions of the first and second drive plates 54 and 55 are axially spaced from each other. The drive plates 54 and 55 are provided with a plurality of square windows 35 and 36, in which the torsion springs 52 are engaged. As shown in FIG. 3, the second drive plate 55 has an outer peripheral portion 55a, a cylindrical portion 55b and an annular portion 55c. The outer peripheral portion 55a is fixedly coupled to the piston 43 by rivets 56. The cylindrical portion 55b extends axially toward the transmission from the outer peripheral portion 55a. The annular portion 55c extends radially inward from the cylindrical portion 55b. The annular portion 55c is provided with the foregoing square windows 35 and 36. The driven member 51 is an annular plate, of which outer peripheral portion is arranged axially between the drive plates 54 and 55. The driven member 51 is provided with windows 58 in the positions corresponding to the square windows in the drive plates 54 and 55. The torsion springs 52 are arranged in the windows 58. The torsion spring 52 is a coil spring extending in the circumferential direction. The torsion spring 52 is supported in the rotating direction within the foregoing window 58 and the square windows 35 and 36. The driven member 51 is provided at its radially inner portion with a cylindrical portion 38, which extends axially toward the transmission. The cylindrical portion 38 is provided at its end with a plurality of claws 59 extending axially toward the transmission.

The damper mechanism 44 further includes a claw member 53. The claw member 53 is firmly fixedly coupled to the turbine 11 for integral rotation. The claw member 53 is a member allowing relative rotation and axial movement with respect to the driven member 51. The claw member 53 has an annular portion 60 fixedly coupled to the turbine hub 23 by the rivets 24 together with the turbine shell 20. The annular portion 60 is provided at its inner periphery with a claw portion 61 extending radially inward. The claw portion 61 is engaged with the claws 59 of the driven member 51. The claw portion 61 is engaged with the claws 59 of the driven member 51. In this state, the driven member 51 is unrotatable and axially movable with respect to the turbine 11. An axial communication space is kept radially in the engaged portions of the claw portion 61 and the claws 59.

The outer peripheral surface of the cylindrical portion 38 of the driven member 51 is in contact with and is radially supported by the inner peripheral surface of the second driven plate 55. In this manner, the driven plate 51 is centered with respect to the turbine hub 23 via the second drive plate 55 and the first piston 43.

In this manner, since it is not necessary to position radially and directly the driven member 51 with respect to the turbine hub 23, it is not necessary to perform machining for forming a spline on the turbine hub 23 for engagement between the piston mechanism 41 and the turbine 11. Therefore, the whole processing cost can be reduced.

Figure 2:
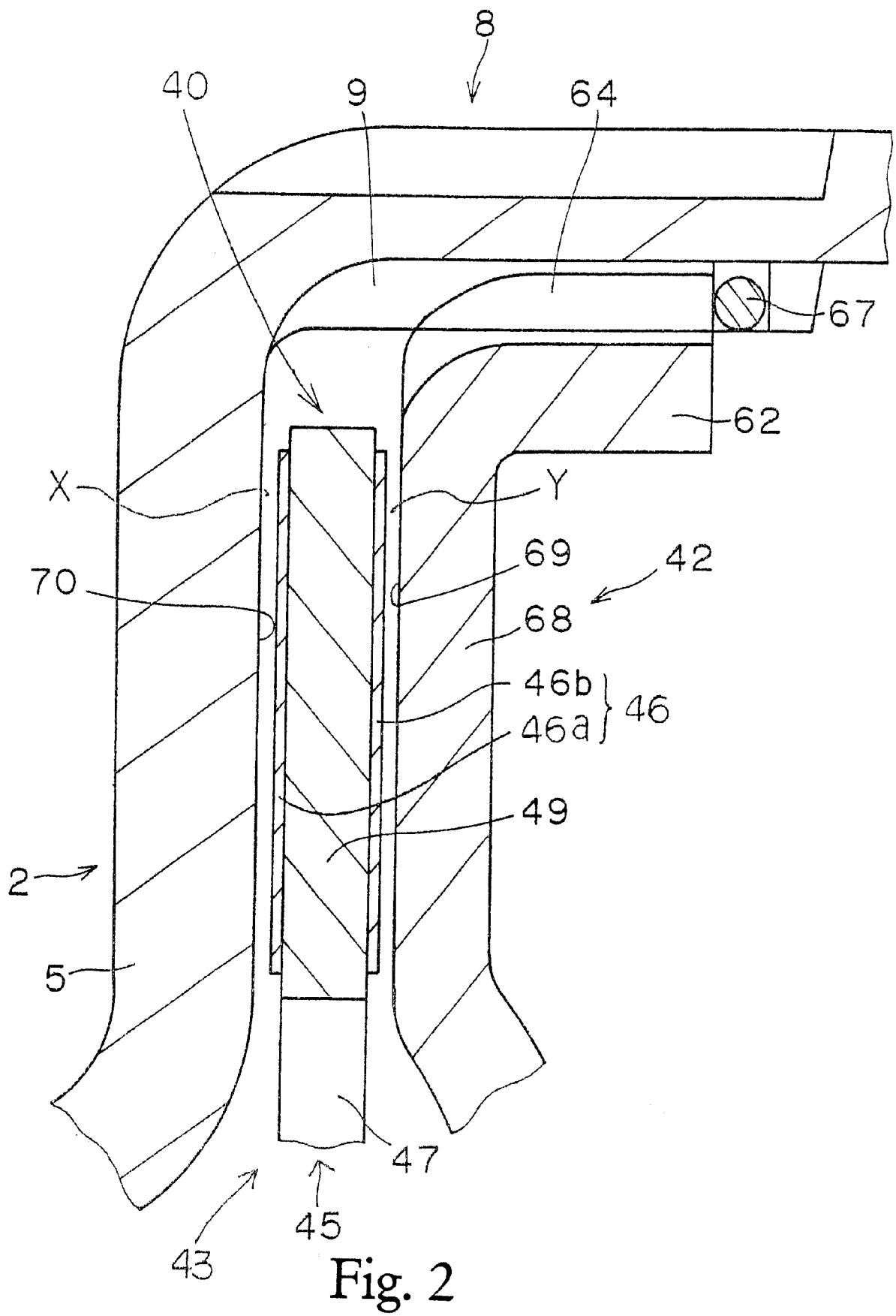
FIG. 2 is an enlarged, partial schematic cross sectional view of a clutch coupling portion of the lock-up clutch shown in FIG. 1.

The piston 42 is arranged in the second space E, and is located on the transmission side of the outer peripheral portion of the first piston 43 and radially outside the damper mechanism 44. The piston 42 is an annular plate, and has a second frictional coupling portion 68 axially neighbouring to the transmission side of the first frictional coupling portion 49. The second frictional coupling portion 68 has an annular flat form as shown in FIG. 2, and has a pressing surface 69 on the engine side. The pressing surface 69 is axially opposed to the second friction member 46b. The piston 42 is provided at its outer periphery with an outer cylindrical portion 62 axially extending toward the transmission. The outer cylindrical portion 62 is arranged close to the inner peripheral surface of the outer cylindrical portion 8. The outer cylindrical portion 62 is provided with teeth 64 projecting in radially opposite directions from the alternate positions. The teeth 64 are engaged with the lug or spline 9 formed on the outer cylindrical portion 8 of the front cover 2. Owing to this engagement, the piston 42 is unrotatable and axially movable with respect to the front cover 2. An annular groove is formed in a portion on the transmission side of the lug or spline 9, and a wire ring 67 is arranged in this groove. The wire ring 67 is in contact with the end surface on the transmission side of the outer cylindrical portion 62 of the piston 42 so that the axial movement of the piston 42 toward the transmission is restricted. A space in which the working fluid can axially flow is formed in the engaged portions of the teeth 64 and the lug or spline 9.

The piston 42 is provided at its inner periphery with an inner cylindrical portion 63, which extends axially toward the transmission. The inner periphery of the inner cylindrical portion 63 is supported by an outer peripheral surface 73 of the cylindrical portion 55b of the second drive plate 55, and thereby is radially positioned so that it can move in the rotating and axial directions. An annular groove is formed on the outer peripheral surface 73, and a seal ring 66 is arranged in this groove. The seal ring 66 is in contact with the inner peripheral surface of the inner cylindrical portion 63. This seal ring 66 provides a seal formed on the inner periphery of the piston 42 and between the axially opposite spaces. In this manner, a third space F is primarily formed axially between the outer peripheral portion of the first piston 43 and the piston 42. The third space F is closed by the foregoing seal ring 66 from the other portion of the second space E. The outer peripheral portion of the third space F is closed when the first and second frictional coupling portions 49 and 68 are in contact with each other, and is opened when they are spaced from each other. Since the third space F is formed between the piston 42 and the plate 45, the structure requires a reduced number of parts, and therefore can be simple. The plate 45 is provided with a plurality of axial through-apertures 47, which are located radially inside the first frictional coupling portion 49. Via these apertures 47, first and third spaces D and F are in communication with each other.

A clutch coupling portion 40 of the lock-up device 4 will now be described together with a summary of the above description. The clutch coupling portion 40 is formed of a friction surface 70 of the front cover 2, the first frictional coupling portion 49 of the first piston 43 and a pressing surface 69 of the second frictional coupling portion 68 of the piston 42. In this manner, the clutch coupling portion 40 has two friction surfaces. The piston 42 and the second drive plate 55 rotate relatively to each other when the clutch coupling portion 40 is disengaged. When the clutch coupling portion 40 is engaged, the piston 42 and the second drive plate 55 rotate together, and the no slide occurs in the rotating direction between the inner cylindrical portion 63 and the cylindrical portion 55b.

In this structure, first and second frictional coupling portions 49 and 68 form pistons, which move axially by themselves, respectively. Therefore, the first piston 43 applies the pressing force between the friction surface 70 and the friction member 46, and the piston 42 applied the pressing force between the friction member 46 and the pressing surface 69.

In this clutch coupling portion 40, an inner diameter (ID2) of the piston 42 is larger than an inner diameter (ID1) of the first piston 43. Therefore, the pressing force applied from the piston 42 to the first frictional coupling portion 49 is smaller than that in the case where the piston 42 and the first piston 43 have equal inner diameters. Accordingly, the produced pressing force can be smaller than that in the case where the friction surface is merely doubled, and therefore wearing and breakage of the friction member 46 and others can be prevented. By changing the size of the piston 42, it is possible to change the pressing force acting on the clutch coupling portion 40. It can be considered that the inner diameter of the piston 42 is larger than the inner diameter of the piston mechanism 41. This structure achieves the foregoing excellent effect in the case where the piston mechanism 41 is not provided with the damper mechanism 44.

The piston 42 which is an input member rotating together with the front cover 2 is arranged radially outside the damper mechanism 44. More specifically, the inner diameter of the piston 42 is larger than the outer diameter of the damper mechanism 44, and the piston 42 is arranged radially outside the damper mechanism 44. Therefore, the space on axially one side of the damper mechanism 44 is not restricted. Accordingly, it is possible to increase the axial size of the torsion spring 52 in the damper mechanism 44. This facilitates design, and can improve the function of the torsion spring 52 such as reduction in rigidity.

Further, the piston 42 which is a piston member moving by itself in the axial direction is radially supported by a portion of the damper mechanism 44, and particularly, by the second drive plate 55 forming the drive member. Thereby, a member or structure dedicated to supporting of the piston 42 is not required so that the whole structure of the lock-up device 4 can be simple.

The operations are now described. In the clutch released state, the third oil passage supplies the working fluid to the radially inner side of the first space D. The working fluid in the first space D flows to the radially outer side of the second space E through the radially outer portion of the space D, the space between the friction surface 70 and the first friction member 46a and the space between the lug or spline 9 and the teeth 64. The working fluid in the second space E flows through the space between the impeller shell 15 and the turbine shell 20, and then flows into the fluid operation chamber B through the space between the outlet of the impeller 10 and the inlet of the turbine 11. The working fluid moving in the first space D flows into the third space F through the apertures 47 formed in the first piston 43. The working fluid in the third space F flows radially outward through the space between the pressing surface 69 and the second friction member 46b. The working fluid flows to the radially outer portion of the second space E through the space between the lug or spline 9 and the teeth 64.

In this structure, the first piston 43 and the piston 42 move axially in accordance with changes in hydraulic pressure in the space C. Therefore, both the members can stably operate in the axial direction. Therefore, contact between the respective members in the clutch coupling portion 40 is suppressed. More specifically, the wire ring 67 restricts the axial movement of the piston 42 toward the transmission, and the turbine hub 23 restricts the axial movement of the first piston 43. Therefore, as shown in FIG. 2, predetermined clearances are reliably kept between the friction surface 70 and the first friction member 46a and further between the second friction member 46b and the pressing surface 69.

The clutch coupling operation will now be described. The working fluid in the first space D is drained through the third oil passage. Thereby, the working fluid in the first space D flows toward the radially inner side, and the working fluid in the third space F flows into the first space D via the apertures 47. Consequently, the first piston 43 axially moves toward the engine to bring the first frictional coupling portion 49 into contact with the friction surface 70 of the front cover 2. Further, the piston 42 axially moves toward the engine, and the pressing surface 69 comes into contact with the second friction member 46b. In this manner, the apertures 47 communicate the first and second spaces d and F with each other so that the piston 42 can move smoothly.

The clutch releasing operation will now be described herein. When the working fluid is supplied from the third oil passage into the first space D, the working fluid moves radially outward, and then flows into the third space F through the apertures 47. Thereby, the first piston 43 and the piston 42 move axially toward the transmission. In this manner, the apertures 47 enable smooth movement of the piston 42.

The first frictional coupling portion 49 of the first piston 43 has an annular and flat form, and carries the friction members 46 fixedly coupled to its axially opposite sides, respectively. The first piston 43 functions as a friction disk for a wet clutch, and more specifically the friction disk, which is formed of a friction plate and friction members fixedly coupled to the opposite sides of the friction plate.

Figure 4:
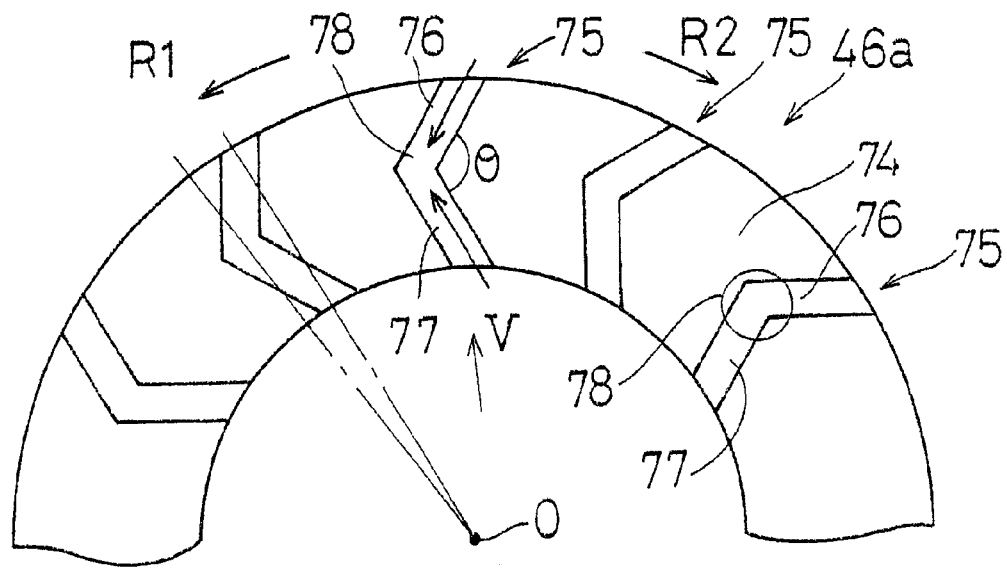
FIG. 4 is a fragmentary elevational view of the friction member shown in FIGS. 1 and 2 with grooves formed on a friction surfaces or facing.

Referring to FIG. 4, description will now be given on a form of the first friction member 46a. The first friction member 46a includes an annular flat plate as its main body, and is fixedly coupled to the surface on the engine side of the first frictional coupling portion 49. The first surface of the first friction member 46a is fixedly coupled to the first frictional coupling portion 49 by adhesive or the like. The second surface of the first friction member 46a is opposed to the friction surface 70. This second surface forms a frictional engagement surface.

Figure 5:
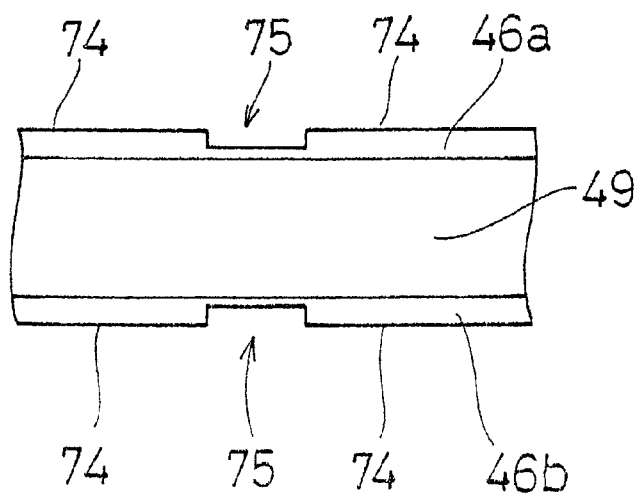
FIG. 5 is partial edge view of the friction member as viewed along arrow V in FIG. 4.

The first friction member 46a is provided at its second surface with a plurality of circumferentially spaced grooves 75. The grooves 75 are provided for cooling the friction surface by the working fluid which flows therethrough in the clutch engaged state, and for achieving the pressure holding effect, which will be described later, in the clutch disengaged state. In FIG. 4, the grooves 75 are circumferentially equally spaced from each other, but may be unequally spaced from each other. As shown in FIG. 5, each portion 74 which is defined circumferentially between the grooves 75 forms the frictional engagement surface described before.

Description will now be given on the form of each groove 75. Each groove 75 extends through from the inner periphery to the outer periphery of the first friction member 46a, and has a bent portion 78 in its middle portion. The bent portion in this description is a portion where the direction of the groove changes, and the fluid coming from the upstream portion collides with the wall. Each groove 75 is formed of a first groove portion 76 extending radially inward from the outer periphery and a second groove portion 77 extending radially outward from the inner periphery. The first groove portion 76 has a radially outer end which is shifted toward the R2 side with respect to its radially inner end. The second groove portion 77 has a radially inner end which is shifted toward the R2 side with respect to its radially outer end. The radially outer end of the first groove portion 76 is in the substantially same circumferential position as the radially inner end of the second groove portion 77. Thus, the groove 75 has a V-shaped form opened in the direction indicated by the arrow R2.

The groove 75 has a bottom not reaching the first frictional coupling portion 49 so that the first frictional coupling portion 49 is not exposed on the friction surface 70. However, the grooves may be formed, e.g., by employing a plurality of pieces of friction facing, which are arranged to provide an annular form and expose the first coupling portion 49.

When the clutch coupling portion 40 is in the released state, the piston 42 rotates together with the front cover 2, and the first piston 43 rotates together with the turbine 11. Since there is a difference in speed between the impeller 10 and the turbine 11, the first piston 43 rotates relatively to the front cover 2 and the piston 42. Thus, relative rotation occurs between the members located on the opposite sides of a space X, which is formed between the friction surface 70 and the first friction member 46a, and between the members located on the opposite sides of a space Y, which is formed between the second friction member 46b and the pressing surface 69. In FIG. 4, the arrow R1 indicates the rotating direction of the first piston 43, and the arrow R2 indicates the rotating direction of the first piston 43 with respect to the front cover 2 in the clutch released state.

On the first friction member 46a, the working fluid flows in the first and second groove portions 76 and 77, and a collision of the working fluid occurs in the bent portion 78. The pressure rises in the bent portion 78 so that a dynamic pressure occurs on the surface of the first friction member 46a. Accordingly, the first frictional coupling portion 43 of the first piston 43 is axially biased toward the transmission by the friction surface 70 of the front cover 2 so that occurrence of the drag torque is suppressed.

If the first piston relatively rotates in the direction indicated by the arrow R1, each groove 75 must have the V-shaped form opened toward the R1 side.

An angle θ between the first and second groove portions 76 and 77 is 120 degrees in FIG. 4. This angle θ is desirably in a range from 90 degrees to 140 degrees. If the angle is lower than 90 degrees, the first friction member 46a cannot have sufficient durability. If it is larger than 140 degrees, the pressure holding effect by collision of the working fluid cannot be sufficiently achieved.

The second friction member 46b may be provided at its surface with a plurality of the grooves 75. Each of these grooves may have a V-shaped form opened in the rotating direction. In this case, the pressure holding effect can be achieved in the space Y.

Second Embodiment

Figure 6:
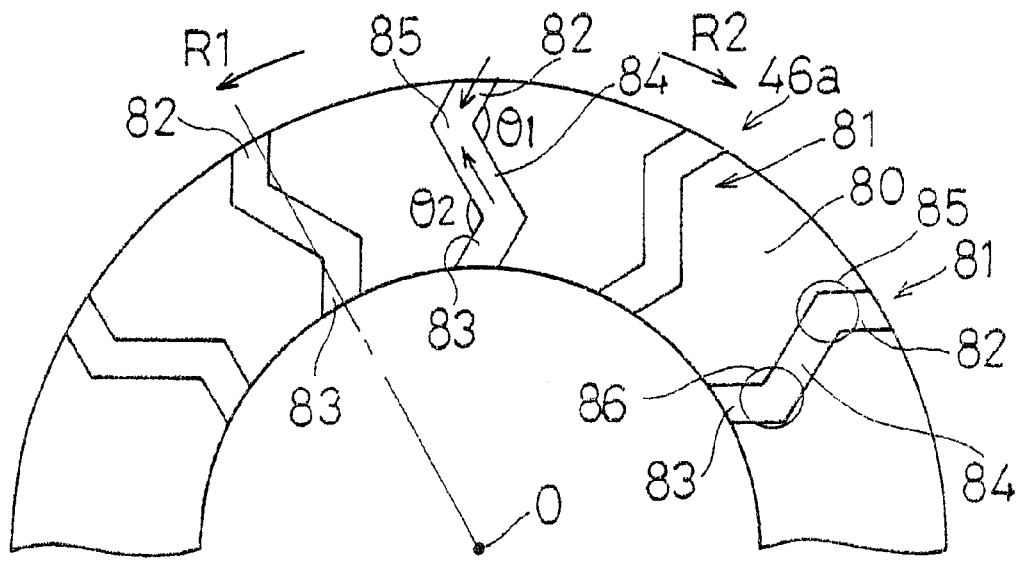
FIG. 6 is a fragmentary elevational view of a friction member in accordance with a second embodiment of the present invention that can be used in the lock-up clutch of the torque converter shown in FIGS. 1 and 2.

The first friction member 46a shown in FIG. 6 is provided at its surface with a plurality of circumferentially spaced grooves 81. In FIG. 6, the grooves 81 are circumferentially equally spaced from each other, but may be unequally spaced from each other. The grooves 81 are provided for cooling the friction surface by the radial flow of the working fluid in the clutch engaged state, and achieving the pressure holding effect, which will be described later, in the clutch released state.

The form of each groove 81 will now be described. Each groove 81 has an even number of bent portions 85 and 86. Preferably, each groove 81 has two bent portions 85 and 86. Each groove 81 is formed of a first groove portion 82 extending radially inward from the outer periphery, a second groove portion 83 extending radially outward from its inner periphery and a third groove portion 84 extending between the first and second groove portions 82 and 83. The first groove portion 82 has the radially outer end shifted toward the R2 side with respect to the radially inner end. The second groove portion 83 has the radially outer end shifted toward the R2 side with respect to the radially inner end. The third groove portion 84 extends substantially straight so that the first and third groove portions 82 and 84 form the bent portion 85 opened in the R2 direction, and the second and third groove portions 83 and 84 form the bent portion 86 opened in the R1 direction. The radially outer end of the first groove portion 82 and the radially inner end of the second groove portion 83 are located on the substantially same position in the circumferential direction. The first and third groove portions 82 and 84 form an angle $\theta_1$ of 120 degrees, and the second and third groove portions 83 and 84 form an angle $\theta_2$ of 120 degrees.

Figure 7:
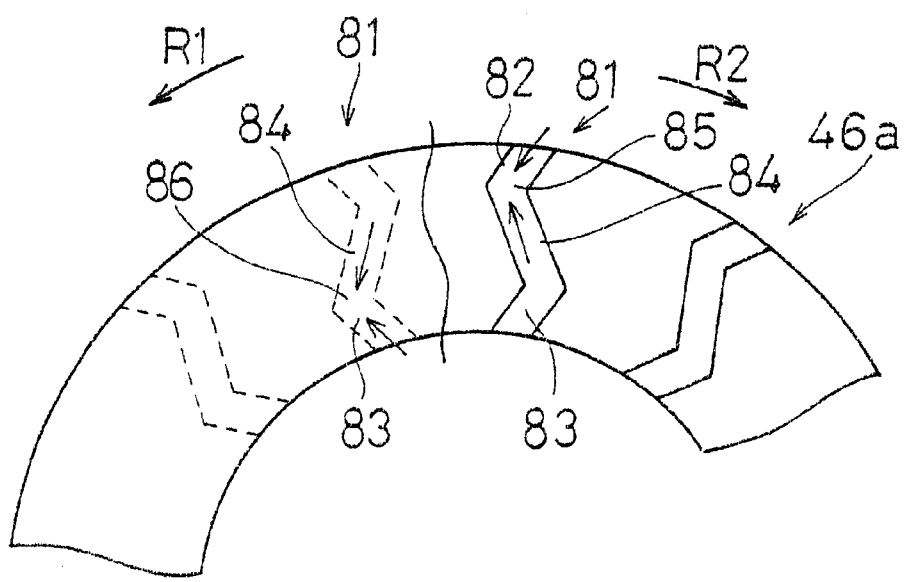
FIG. 7 is a fragmentary elevational view of the friction member shown in FIG. 6 showing the arrangement of grooves on a pair of oppositely facing friction surfaces or facings.

FIG. 7 shows an arrangement of the grooves 81 in the structure employing the first and second friction members 46a and 46b using the same friction facings. The inclinations of the first, second, and third groove portions 82, 83, and 84 on the first friction member 46a are opposite to those on the second friction member 46b.

The groove 81 has a bottom not reaching the first frictional coupling portion 49 so that the first frictional coupling portion 49 is not exposed on the friction surface 70. However, the grooves 81 may be formed, e.g., by employing a plurality of pieces of friction facing, which are arranged to provide an annular form and expose the first coupling portion 49.

When the clutch coupling portion 40 is in the released state, the piston 42 rotates together with the front cover 2, and the first piston 43 rotates together with the turbine 11. Since there is a difference in speed between the impeller 10 and the turbine 11, the first piston 43 rotates relatively to the front cover 2 and the piston 42. Thus, relative rotation occurs between the members located on the opposite sides of a space X, which is formed between the friction surface 70 and the first friction member 46a, and between the members located on the opposite sides of a space Y, which is formed between the second friction member 46b and the pressing surface 69. In FIG. 6, the arrow R1 indicates the rotating direction of the first piston 43, and the arrow R2 indicates the rotating direction of the first piston 43 with respect to the front cover 2 in the clutch released state.

On the first friction member 46a side, the working fluid primarily flows from the first groove portion 82, and a collision of the working fluid occurs in the bent portion 85. The pressure rises in the bent portion 85 so that a dynamic pressure occurs on the surface of the first friction member 46a. Accordingly, the first frictional coupling portion 43 of the first piston 43 is axially biased toward the transmission from the side of the friction surface 70 of the front cover 2 so that occurrence of the drag torque is suppressed.

On the second friction member 46b side, the working fluid primarily flows from the second groove portion 83, and the collision of the working fluid occurs in the bent portion 86. The pressure rises in the bent portion 86 so that a dynamic pressure occurs on the surface of the second friction member 46b. Accordingly, the first frictional coupling portion 43 of the first piston 43 is axially biased toward the engine by the pressing surface 69 of the piston 42 so that occurrence of the drag torque is suppressed.

As described above, since the collision of working fluid occurs in the one bent portion on each of the axially opposite sides of the first frictional coupling portion 49, the substantially same dynamic pressures occur on the axially opposite sides of the first frictional coupling portion 49. As a result, the first piston 43 can substantially keep the axially neutral position.

In this manner, good results can be achieved even by the structure in which the same kind of friction facings are fixedly coupled to the opposite sides. As a result, it is not necessary to prepare two kinds of friction facings having different patterns so that the cost can be reduced.

Third Embodiment

Figure 8:
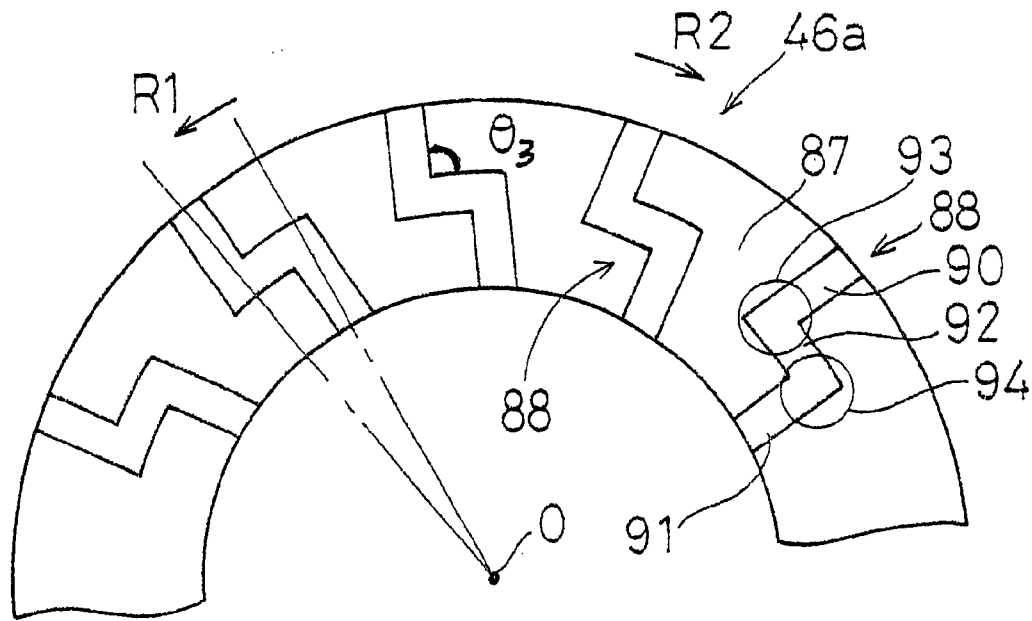
FIG. 8 is a fragmentary elevational view of a friction member in accordance with a third embodiment of the present invention that can be used in the lock-up clutch of the torque converter shown in FIGS. 1 and 2.

The first friction member 46a shown in FIG. 8 is provided at its surface with a plurality of circumferentially spaced grooves 88. In FIG. 8, the grooves 88 are circumferentially equally spaced from each other, but may be unequally spaced from each other. The grooves 88 are provided for cooling the friction surface by the radial flow of the working fluid in the clutch engaged state, and achieving the pressure holding effect, which will be described later, in the clutch released state.

The form of each groove 88 will now be described in more detail. Each groove 88 has an even number of (more specifically, two) bent portions 93 and 94. Each groove 88 is formed of a first groove portion 90 extending radially inward from the outer periphery, a second groove portion 91 extending radially outward from its inner periphery and a third groove portion 93 extending between the first and second groove portions 90 and 91. The first and second groove portions 90 and 91 extend substantially in the radial direction. The second groove portion 91 is shifted toward the R2 side with respect to the first groove portion 90. The third groove portion 92 extends substantially in the circumferential direction. The end on the R1 side of the third groove portion 92 and the radially inner end of the first groove portion 90 form a bent portion 93. The end on the R2 side of the third groove portion 92 and the outer peripheral portion of the second groove portion 91 form a bent portion 94. An angle $\theta_3$ defined between the first and third groove portions 90 and 92 is substantially equal to 90 degrees, and an angle $\theta_4$ defined between the second and third groove portions 91 and 92 is substantially equal to 90 degrees. In this embodiment, the first and second groove portions 90 and 91 can be further spaced from each other in the circumferential direction, and the length of the third groove portion 92 can be increased in the circumferential direction, whereby an area occupied by the groove 88 in the friction surface can be increased without forming an acute angle in each bent portion. Thereby, the clutch cooling effect can be improved. As the angle in each bent portion becomes more acute, the durability of the friction member lowers.

Figure 9:
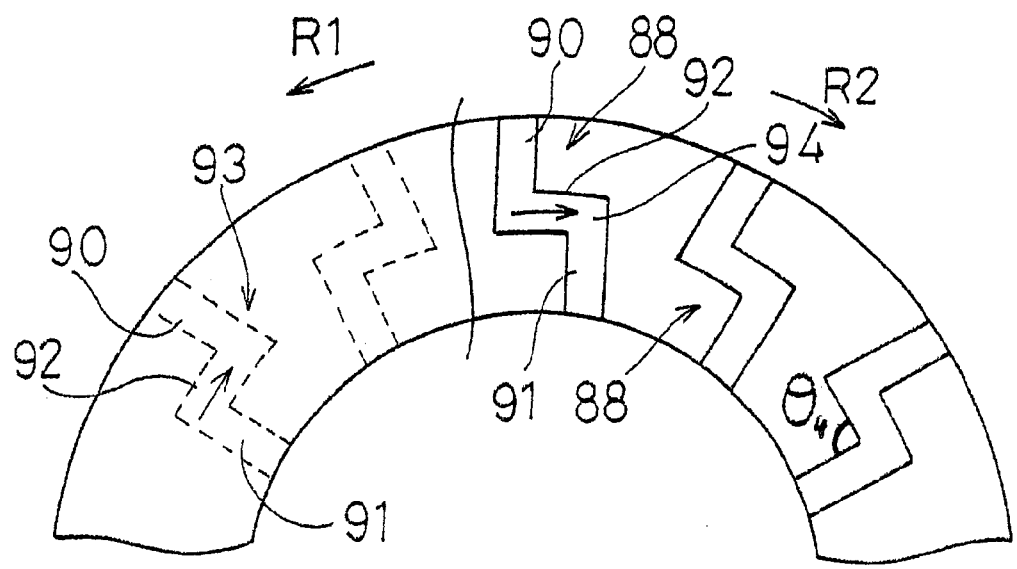
FIG. 9 is a fragmentary elevational view of the friction member shown in FIG. 8 showing the arrangement of grooves on a pair of oppositely facing friction surfaces or facings.

FIG. 9 shows the positions of the respective grooves 88 in the structure wherein the foregoing friction facings are fixedly coupled to the first and second friction members 46a and 46b. On the second friction member 46b, the first groove portion 90 is shifted toward the R2 side with respect to the second groove portion 91.

The effect of reducing the drag torque by the collision of the working fluid can be similar to that of the embodiments already described.

The groove 88 has a bottom not reaching the first frictional coupling portion 49 so that the first frictional coupling portion 49 is not exposed on the friction surface 70. However, the grooves 88 may be formed, e.g., by employing a plurality of pieces of friction facing, which are arranged to provide an annular form and expose the first coupling portion 49.

When the clutch coupling portion 40 is in the released state, the piston 42 rotates together with the front cover 2, and the first piston 43 rotates together with the turbine 11. Since there is a difference in speed between the impeller 10 and the turbine 11, the first piston 43 rotates relatively to the front cover 2 and the piston 42. Thus, relative rotation occurs between the members located on the opposite sides of the space X, which is formed between the friction surface 70 and the first friction member 46a, and between the members located on the opposite sides of the space Y, which is formed between the second friction member 46b and the pressing surface 69. In FIG. 9, the arrow R1 indicates the rotating direction of the first piston 43, and the arrow R2 indicates the rotating direction of the first piston 43 with respect to the front cover 2 in the clutch released state.

On the first friction member 46a, the working fluid flowing in the R2 direction through the third groove portion 92 cause collision in the bent portion 94. The pressure rises in the bent portion 94 so that a dynamic pressure occurs on the surface of the first friction member 46a. Accordingly, the first frictional coupling portion 43 of the first piston 43 is axially biased toward the transmission from the side of the friction surface 70 of the front cover 2 so that occurrence of the drag torque is suppressed.

On the second friction member 46b side, the working fluid flowing in the R2 direction through the third groove portion 92 cause collision in the bent portion 93. The pressure rises in the bent portion 93 so that a dynamic pressure occurs on the surface of the second friction member 46b. Accordingly, the first frictional coupling portion 43 of the first piston 43 is axially biased toward the engine by the pressing surface 69 of the piston 42 so that occurrence of the drag torque is suppressed.

As described above, since the collision of working fluid occurs in the one bent portion on each of the axially opposite sides of the first frictional coupling portion 49, the substantially same dynamic pressures occur on the axially opposite sides of the first frictional coupling portion 49. As a result, the first piston 43 can substantially keep the axially neutral position.

In this manner, good results can be achieved even by the structure in which the same kind of friction facings are fixedly coupled to the opposite sides. As a result, it is not necessary to prepare two friction facings having different patterns so that the cost can be reduced.

The friction member according to the invention as well as the wet clutch friction disk using the friction member are not restricted to the structures employing the first pistons 43 of the foregoing embodiments. For example, the invention can be applied to the clutch plate not having the piston function. The wet clutch employing the invention is not restricted to the lock-up clutch device, but may be employed in a power cut-off clutch. The wet clutch employing the invention is not restricted to the torque converter, and may be a multiple-disk clutch of a transmission.

In each of the second and third embodiments, the substantially same dynamic pressures can be produced on the axially opposite sides of the friction disk provided that each groove has the even bent portion(s). If the bent portions are four in number, the collision of the working fluid occurs in the two bent portions of each groove on the one side, and also the collision of the working fluid primarily occurs in the two bent portions on the other side. In this case, it is likewise not necessary to prepare two kinds of friction facings having different patterns so that the cost can be reduced.

In the friction disk according to the invention, since each of the plurality of grooves has the even bent portions, the bent portion(s), where the collision of fluid occurs, on one of the axially opposite sides are equal in number to the bent portion(s) on the other side. As a result, the same dynamic pressures occur on the axially opposite sides of the friction plate so that the friction plate can keep the predetermined axial position.

Fourth Embodiment

Figure 10:
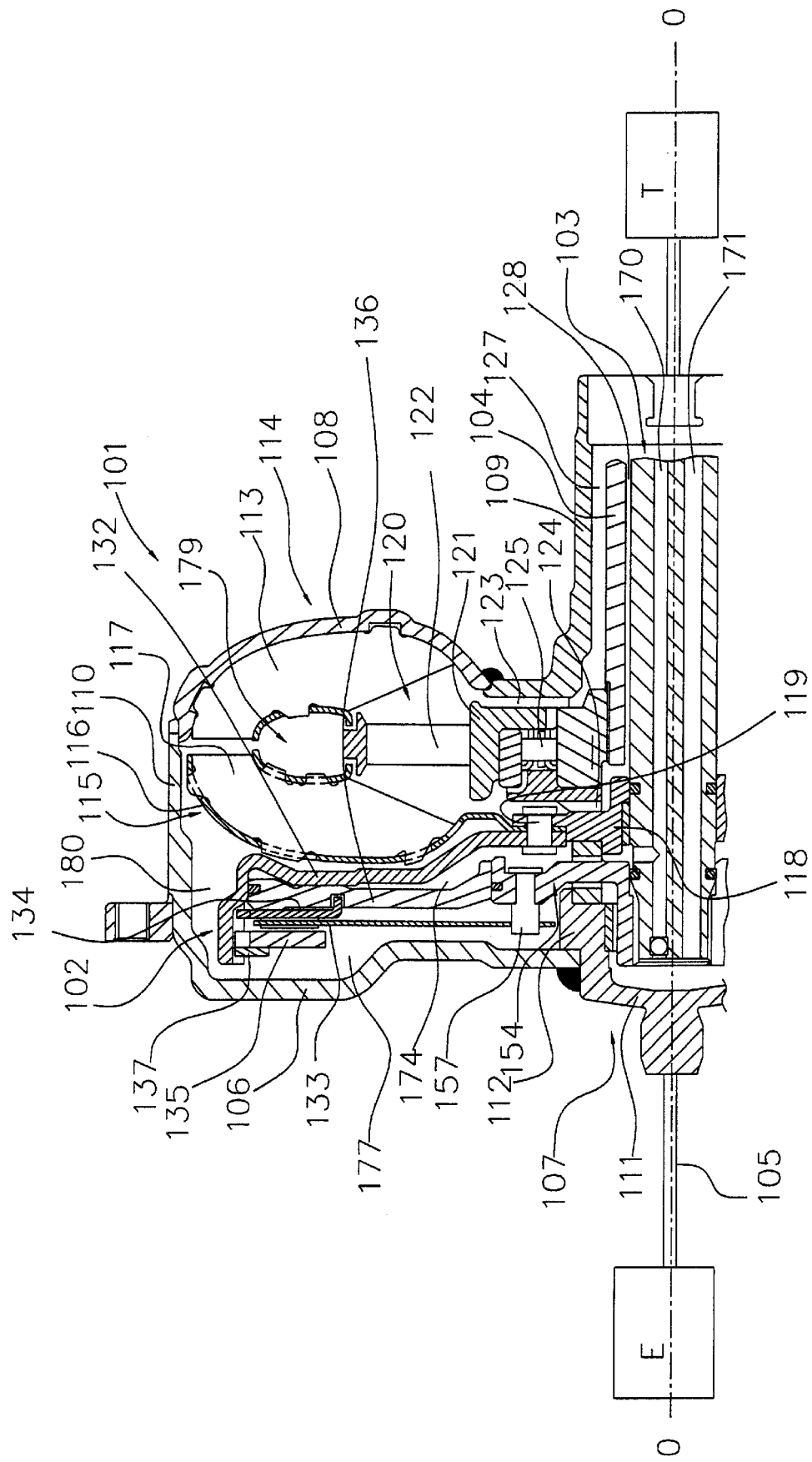
FIG. 10 is a schematic cross sectional view of a torque converter with a power cut-off clutch according to a fourth embodiment of the present invention.

FIG. 10 shows a torque converter 101 of an embodiment of the invention. Center line O—O indicates a rotation axis of the torque converter 101. The torque converter 101 is arranged between an engine of a vehicle and a transmission, and is configured to transmit engine torque to the transmission via fluid. More specifically, the torque converter 101 transmits the torque from a crankshaft 105 of the engine, which is an example of an input rotary member, to a main drive shaft 103 of the transmission, which is an example of an output rotary member.

The torque converter 101 primarily includes a front cover 106, an impeller 114, a turbine 115, a stator 120 and a power cut-off clutch 102. The front cover 106 is supplied with the torque from the crankshaft 105 of the engine. The impeller 114 is arranged on the transmission side of the front cover 106. The impeller 114 forms the fluid chamber together with the front cover 106. The turbine 115 is arranged in the fluid chamber and is opposed to the impeller 114. The turbine 115 forms a fluid operation chamber together with the impeller 114. The stator 120 is arranged radially inside the impeller 114 and the turbine 115. The stator 120 regulates the flow from the turbine 115 to the impeller 114. The power cut-off clutch 102 is arranged axially between the front cover 106 and the turbine 115, and can selectively transmit and interrupt the torque from the turbine 105 to the transmission.

The front cover 106 is a circular plate-like member arranged on the engine side. A hub 107 is welded to the inner peripheral portion of the front cover 106. The hub 107 is primarily formed of a central portion 111 and a cylindrical portion 112 extending from the outer periphery of the central portion 111 toward the transmission. The outer periphery of the front cover 106 is provided with a cylindrical outer peripheral wall 110 extending axially toward the transmission.

The impeller 114 is primarily formed of an impeller shell 108, blades 113 and an impeller hub 109. The outer periphery of the impeller shell 108 is fixedly coupled to the outer periphery of the outer peripheral wall 110 of the front cover 106. The blades 113 are arranged on the fluid chamber side of the impeller shell 108. The impeller hub 109 is fixedly coupled to the inner periphery of the impeller shell 108. The impeller hub 109 has a cylindrical form extending axially toward the transmission.

Figure 12:
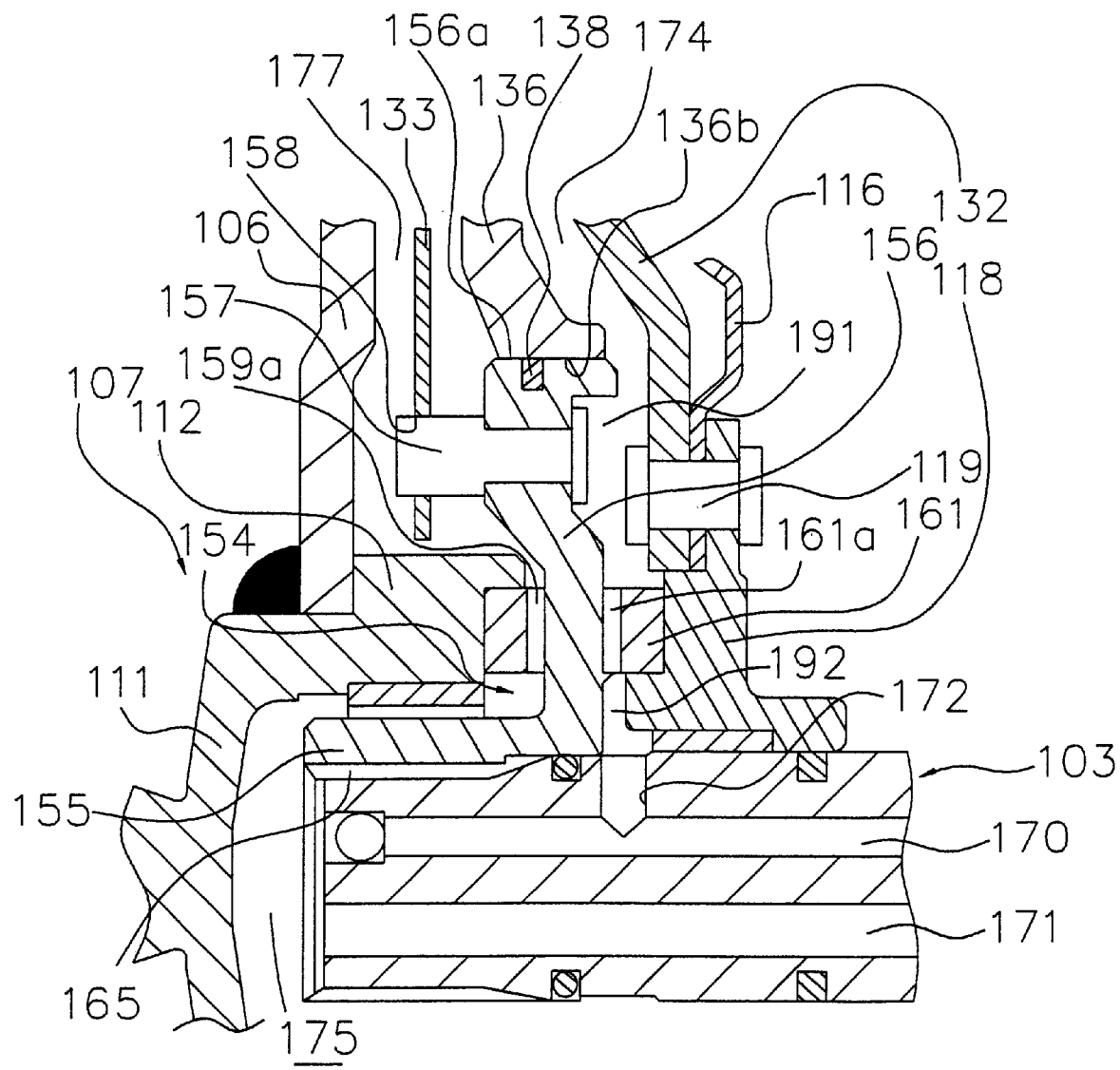
FIG. 12 is an enlarged fragmentary cross sectional view of a radially inner portion of the power cut-off clutch shown in FIG. 10.

The turbine 115 is arranged within the fluid chamber, and is located in the position opposed to the impeller 114. The turbine 115 is primarily formed of a turbine shell 116 and a plurality of turbine blades 117 fixedly coupled to the turbine shell 116. The turbine 11 5 sends the torque to the power cut-off clutch 102, which will be described later. The inner peripheral portion of the turbine shell 116 is fixedly coupled to the turbine hub 118 by a plurality of rivets 119. The turbine hub 118 is an annular member, and is rotatably supported on the main drive shaft 103 via a bushing as shown in FIG. 12.

The stator 120 is arranged radially inside the impeller 114 and the turbine 115, and is primarily formed of a carrier 121 and a plurality of blades 122 arranged on the carrier 121. The stator 120 is provided for regulating the working fluid, which flows from the turbine 115 to the impeller 114. The stator 120 is supported on the fixed shaft 104 via the one-way clutch 125. The fixed shaft 104 is a cylindrical member arranged radially inside the impeller hub 109, and is fixedly coupled to the front cover (not shown) of the transmission. The impeller 114, turbine 115, and stator 120 described above form a fluid operation chamber 179 of a torus form, in which the torque is transmitted by the operation of the fluid.

The carrier 121 of the stator 120 and the one-way clutch 125 are arranged and supported axially between the impeller hub 109 and the turbine hub 118, and keep spaces 123 and 124, which are formed between them and function as radial fluid passages. The space 123 between the stator 120 and the impeller hub 109 is in communication with the first oil passage 127 formed between the impeller hub 109 and the fixed shaft 104. The space 124 between the stator 120 and the turbine hub 118 is in communication with a second oil passage 128 which is formed between the fixed shaft 104 and the main drive shaft 103. Each of the first and second oil passages 127 and 128 has an annular section and extends axially for discharging the working fluid from the fluid operation chamber 179 of the torque converter 101. The first and second oil passages 127 and 128 are communicated with a hydraulic operation mechanism (not shown) including an oil pump, a control valve and various oil passages.

The power cut-off clutch 102 is a clutch arranged in the torque transmission path between the turbine 15 or the output member of the torque converter 101 and the main drive shaft 103. Therefore, the power cut-off clutch 102 is arranged in series with the portion for transmitting the torque by the fluid in the torque converter 101. More specifically, the power cut-off clutch 102 is arranged in the fluid chamber, and is located axially between the circular plate-like portion of the front cover 106 and the turbine 115. The power cut-off clutch 102 is primarily formed of a pair of drive plates 134 and 135, a piston 136, a driven plate 133, and a pair of friction facings 141 and 142.

In this embodiment, an input plate 132 is arranged on the transmission side with respect to the piston 136, and neighbors the engine side of the turbine 115. The input plate 132 is a circular or annular member, and has an inner peripheral portion fixedly coupled to the turbine hub 118 by the rivets 119. The input plate 132, turbine hub 118 and turbine 115 having the above structures can rotate together with each other, and is rotatably supported on the main drive shaft 103 via a bushing. The input plate 132 is provided at its outer periphery with a cylindrical portion 139, which extends toward an engine. The cylindrical portion 139 has an inner peripheral surface 139a, which has an axially straight section and is located near the turbine 115. In addition, a plurality of teeth 145 located near the engine is formed on the inner peripheral surface of the cylindrical portion 139. The teeth 145 are circumferentially spaced from each other, and each extends in the axial direction.

The drive plates 134 and 135 are coupled to the turbine 115 to receive the torque from the engine. The first drive plate 134 is arranged on the engine side, while the second drive plate 135 is arranged on the transmission side. The drive plates 134 and 135 are arranged radially inside the cylindrical portion 139. The first drive plate 134 is provided at its outer periphery with teeth 143 engaging with the teeth 145 of the cylindrical portion 139. Thereby, the first drive plate 134 is unrotatable and axially movable with respect to the input plate 132. The first drive plate 134 is provided at its inner periphery with a plurality of projections 144 which extend axially toward the transmission. The projections 144 are inserted into a plurality of concavities 146 formed in the piston 136, respectively.

The second drive plate 135 is an annular plate member which is axially opposed to the first drive plate 134, and is located on the engine side with respect to the plate 134. The inner peripheral portion of the second drive plate 135 extends to the vicinity of the inner periphery of the first drive plate 134. The second drive plate 135 has outer teeth 47 engaging with the teeth 145 of the cylindrical portion 139. Thereby, the second drive plate 135 can rotate together with the input plate 132.

A snap ring 137 is in contact with an outer periphery on the engine side of the second drive plate 135. The snap ring 137 is a member for preventing the second drive plate 135 from moving axially toward the engine, and is also a member for bearing a load applied by the piston 136. The snap ring 137 is fixedly coupled to the inner peripheral surface of the end portion of the cylindrical portion 139 near the engine. More specifically, the radially outer portion of the snap ring 137 is fitted into an annular groove 152 formed in the teeth 145. The snap ring 137 is in contact with only the outer peripheral portion of the second drive plate 135, and has an annular portion which overlaps with the pressing surface 149 of the piston 136 when viewed in the axial direction.

The piston 136 is provided for driving the paired drive plates 134 and 135. The piston 136 is an annular and circular plate-like member. The piston 136 is arranged in the position on the front cover 106 side with respect to the circular plate-like portion of the input plate 132, and neighbours to the transmission side of the first drive plate 134. The piston 136 has an outer peripheral surface 136a, which is supported by an inner peripheral surface 139a of the cylindrical portion 139 of the input plate 132. The piston 136 is provided at its outer peripheral surface 136a with an annular groove, in which an O-ring 140 is arranged. The O-ring 140 is in contact with the inner peripheral surface 139a to seal its axially opposite sides. An inner peripheral surface 136b of the piston 136 is axially and movably supported on an outer peripheral surface 156a of a flange 156 of a driven hub 154, which will be described later. The outer peripheral surface 156a is provided with an annular groove, in which an O-ring 138 is arranged. The O-ring 138 is in contact with the inner peripheral surface 136b of the piston 136 to seal its axially opposite sides. As described above, the piston 136 has an outer peripheral surface 136a, which is supported on the input plate 132 in a sealed fashion. The piston 136 also has an inner peripheral surface 136b which is supported in a sealed fashion on the driven hub 154 so that the piston 136 can axially slide.

Figure 11:
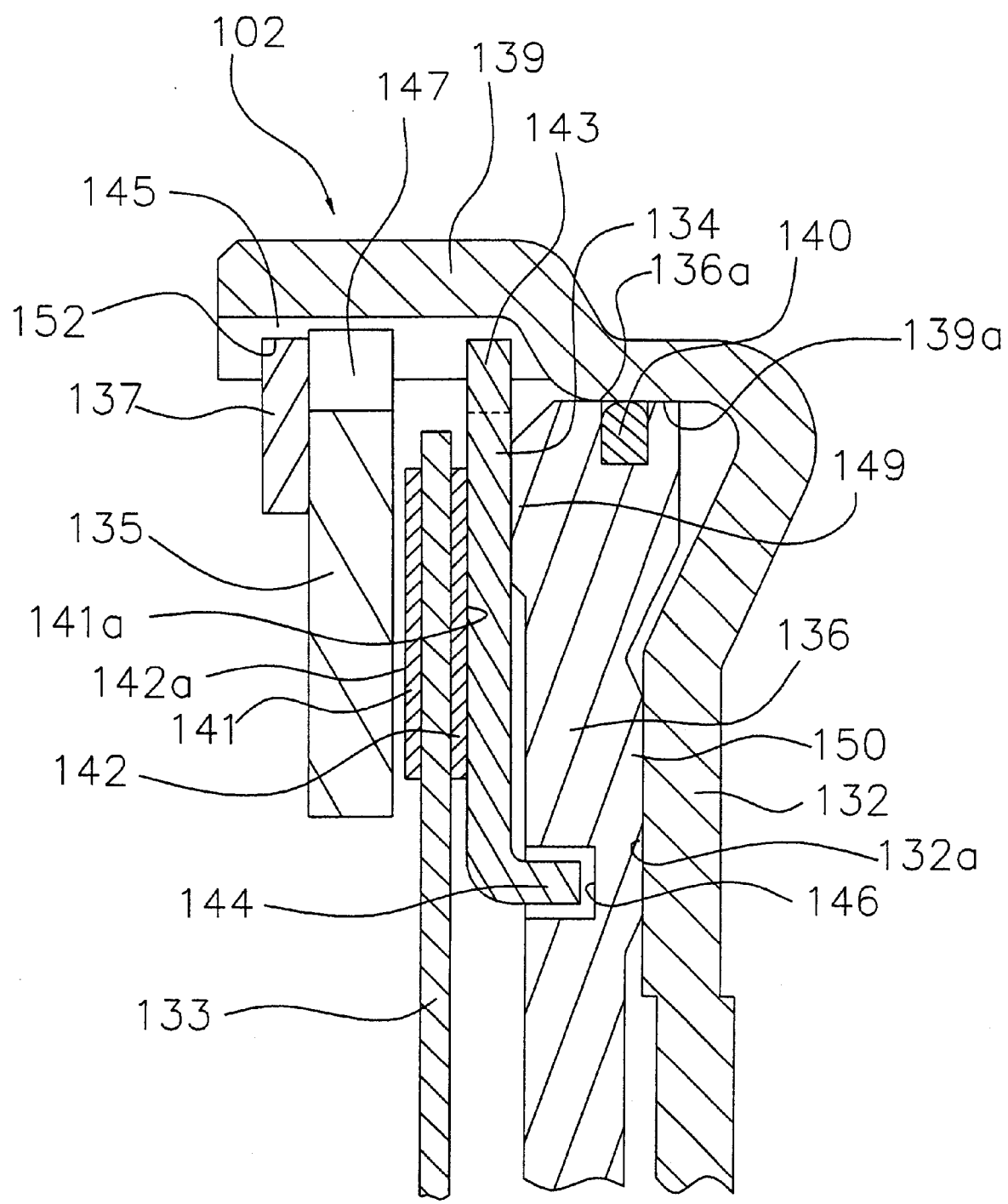
FIG. 11 is an enlarged fragmentary cross sectional view of a radially outer portion of a power cut-off clutch shown in FIG. 10.

The surface of the outer peripheral portion of the piston 136, which is directed axially toward the engine, forms a pressing surface 149. The pressing surface 149 is flat and annular, and is projected or shifted toward the first drive plate 134 of the clutch with respect to the radially inner portion of the piston 136. The piston 136 is provided at its input plate 132 side with an annular and flat contact surface 150. The contact surface 150 is axially shifted toward the transmission with respect to the outer peripheral portion of the piston 136. Accordingly, as shown in FIG. 11, the contact surface 150 is in contact with the annular flat surface 132a of the input plate 132 when the moved piston 136 is in the position nearest to the input plate 132.

The piston 136 is provided at its surface on the engine side with the plurality of concavities 146. The circumferentially opposite ends of each concavity 146 are in contact with the circumferentially opposite ends of the projection 144 of the first drive plate 134 so that both the members rotate together with each other. Thus, no relative rotation occurs between the first drive plate 134 and the piston 136.

The driven plate 133 is a circular plate-like member, which can rotate around the central axis O—O in the fluid chamber formed by the front cover 106 and the impeller 114. The outer peripheral portion of the driven plate 133 is located axially between the paired drive plates 134 and 135. The inner peripheral portion of the driven plate 133 extends radially inward with respect to the inner peripheral portion of the piston 136, and is located in the axial position on the engine side of the flange 156 of the driven hub 154 and radially outside the annular portion 112 of the hub 107. The driven plate 133 is provided at its inner peripheral portion with axial apertures 158 located in positions corresponding to pins 157, respectively. Each pin 157 is fitted into and engaged with the corresponding aperture 158. Thereby, the driven plate 133 is rotatably and axially unmovably supported by the driven hub 154. Thus, the torque of the driven plate 133 is transmitted to the driven hub 154 via the pin 157.

The driven hub 154 is a member for directly sending the torque to the main drive shaft 103. The driven hub 154 is arranged on the engine side with respect to the turbine hub 118. The driven hub 154 is formed of a cylindrical portion 155 and a flange 156 extending radially outward from the axial end on the transmission side of the cylindrical portion 155. The cylindrical portion 155 is arranged between the outer peripheral surface of the main drive shaft 103 and the cylindrical portion 112 of the central portion 111. The cylindrical portion 155 is provided at its inner peripheral surface with a spline, which is engaged with a spline 165 formed on the outer peripheral surface of the end portion of the main drive shaft 103. Thereby, the driven hub 154 can rotate together with the main drive shaft 103. Thus, the torque of the driven plate 133 is transmitted to the main drive shaft 103 of the transmission via the driven hub 154. The flange 156 of the driven hub 154 is provided with an outer peripheral surface 156a, which is opposed to the inner peripheral surface 139a.

Figure 13:
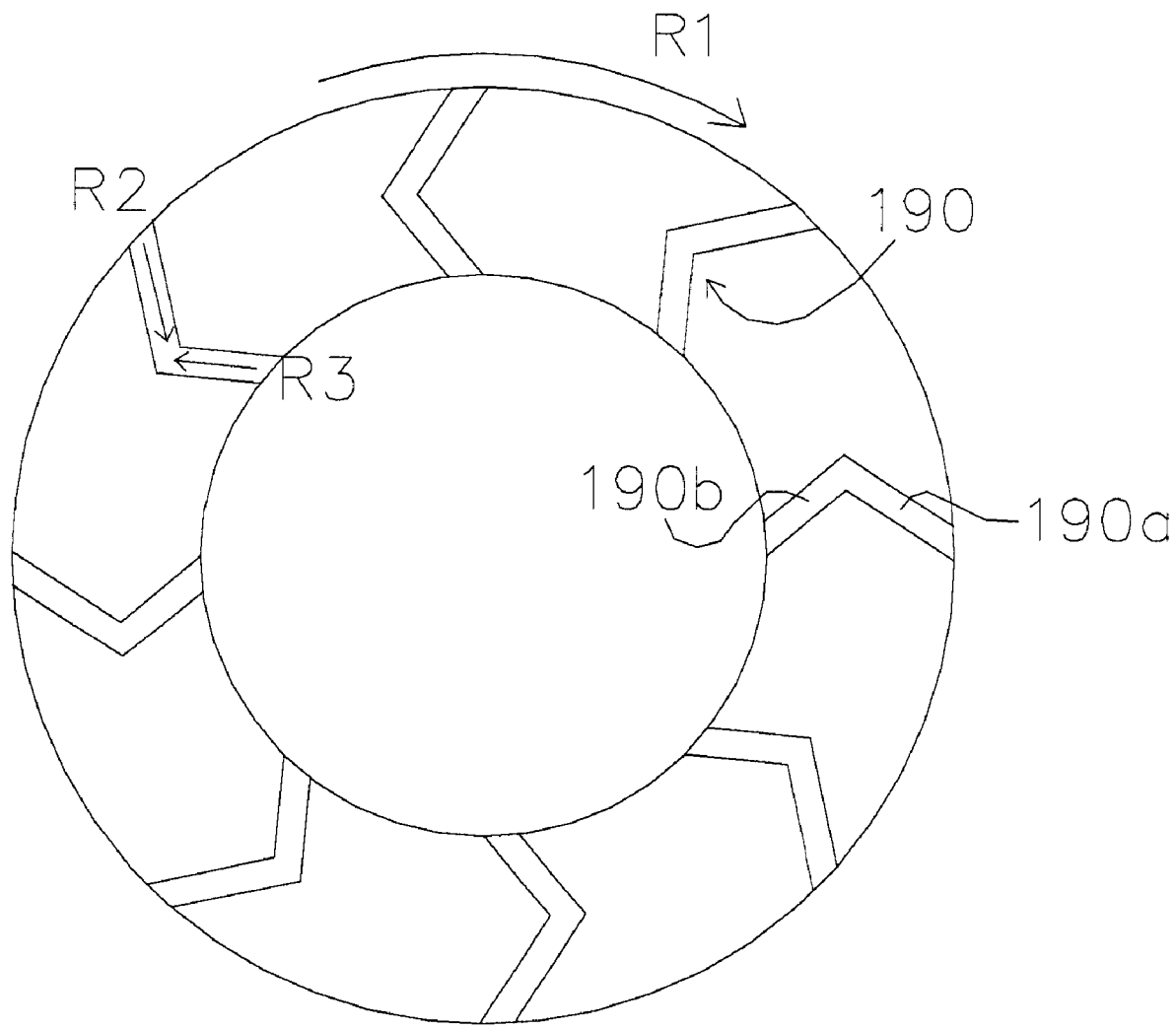
FIG. 13 is an elevational view of an annular friction surface of one of the friction facings.

The driven plate 133 is provided at its outer peripheral portion with the pair of friction facings 141 and 142, which are located at the positions corresponding to the paired drive plates 134 and 135, and are fixedly coupled to the axially opposite surfaces of the driven plate 133, respectively. The paired friction facings 141 and 142 have annular friction surfaces 141a and 142a, which are located between the driven plate 133 and the paired drive plates 134 and 135, respectively. The paired friction facings 141 and 142 are circular plate-like members having apertures at their centers, and are rotatable around the central axes, respectively. Each of the annular friction surfaces 141a and 142a is provided with a plurality of grooves 190, each of which extends through from the inner periphery of the surface 141a or 142a to the outer periphery thereof, and has a bent portion in a radially middle position. As shown in FIG. 13, the bent portion of the groove 190 in this embodiment is bent to form a V-shaped form, which opens in the rotating direction R1 of the friction facings 141 and 142, and has a radially outer groove 190a and a radially inner groove 190b.

The piston 136 forms a hydraulic operation space 174 (hydraulic chamber) between the circular portion of the input plate 132 and the piston 136. The driven plate 154 (particularly, flange 156) keeps a predetermined axial space with respect to the input plate 132 and the turbine hub 118. More specifically, a first space 191 is kept between the outer peripheral portion of the flange 156 and the innermost peripheral portion of the input plate 132, and a second space 192 is kept between the inner peripheral portion of the flange 156 and the turbine hub 118. The first and second spaces 191 and 192 are communicated with each other via a recess 161a of a washer 161. The hydraulic operation space 174 has a radially inner portion, which is communicated with a first passage 170 in the main drive shaft via axial spaces (161, 191, and 192) between the turbine hub 118 and the driven hub 154 and an opening 172. The first passage 170 is provided for axially moving the piston 136 by changing the hydraulic pressure in the hydraulic operation space 174.

The second passage 171 formed in the main drive shaft 103 extends to the axial end of the shaft 103, and is in communication with a space 175 between the central portion 111 of the hub 107 and the shaft 103. The space 175 is in communication with an axial space 177 between the front cover 106 and the power cut-off clutch 102. The axial space 177 is in communication with a space 180 between the power cut-off clutch 102 and the outer peripheral wall 110 of the front cover 106. The space 180 is in communication with the fluid operation chamber 179 via the radially outer portion of the fluid operation chamber 179, i.e., the space between outlet of the impeller 114 and the inlet of the turbine 115. According to the above structure, the working fluid supplied from the second passage 171 passes through an axial position on the engine side of the power cut-off clutch 102, and flows into a fluid operation chamber 179 in the torque converter 101. The fluid in the fluid operation chamber 179 is discharged through the foregoing first and second oil passages 127 and 128. In this manner, the working fluid circulates entirely in the torque converter 101.

Figure 16:
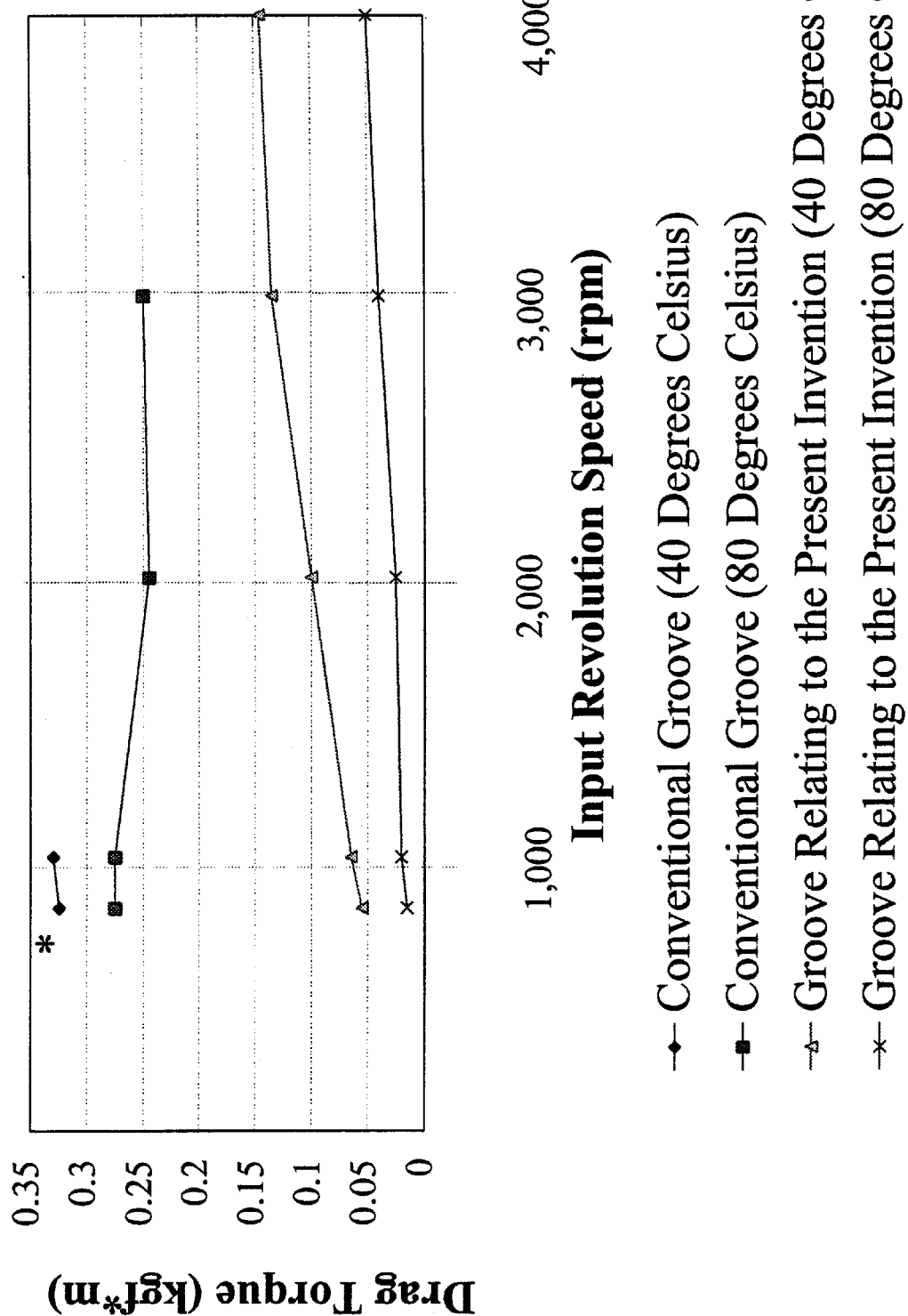
FIG. 16 illustrates a comparative result between amounts of drag torque corresponding to forms of grooves on the annular friction surfaces.

Operations are now described below. For releasing the power cut-off clutch 102, the hydraulic operation mechanism (not shown) drains the working fluid from the hydraulic operation space 174 via the first passage 170. Thereby, the hydraulic pressure in the hydraulic operation space 174 lowers, and the pressure in the axial space 177 relatively increases so that the piston 136 receives a pressure acting axially thereon toward the transmission. In this operation, the working fluid moving near the friction facings 141 and 142 flows in a radially inward direction R2 through the radially outer grooves 190a, and also flows in a radially outward direction R3 through the radially inner grooves 190b. These flows collide with each other at the central region of the groove 190 so that the fluid does not form a flow along the grooves 190 on the friction surfaces 141a and 142a of the friction facings 141 and 142. Accordingly, it is possible to suppress lowering of the hydraulic pressure of the fluid which is located between the drive plates 134 and 135 and the friction facings 141 and 142, and it is possible to prevent the piston 136 from being pulled toward the driven plate 133. As a result, generation of drag torque can be suppressed (see FIG. 16).

In each of the grooves 190 on the annular friction surfaces 141a and 142a of the friction facings 141 and 142, an angle between the radially outer and inner grooves 190a and 190b may take on a value larger than the foregoing value and smaller than 180 degrees.

Figure 14:
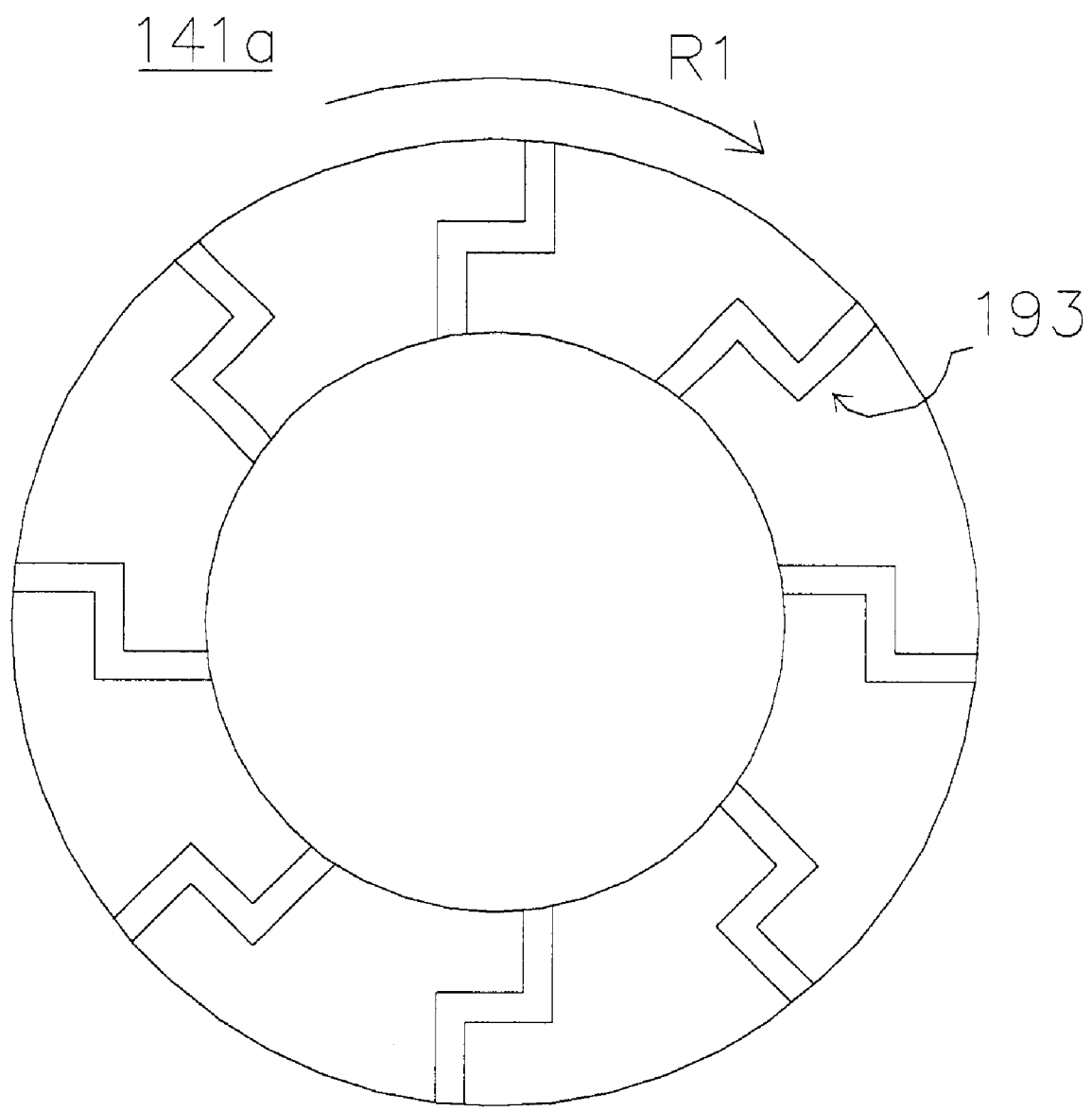
FIG. 14 is an elevational view of a friction surface in another embodiment of the invention, and corresponds to FIG. 13.
Figure 15:
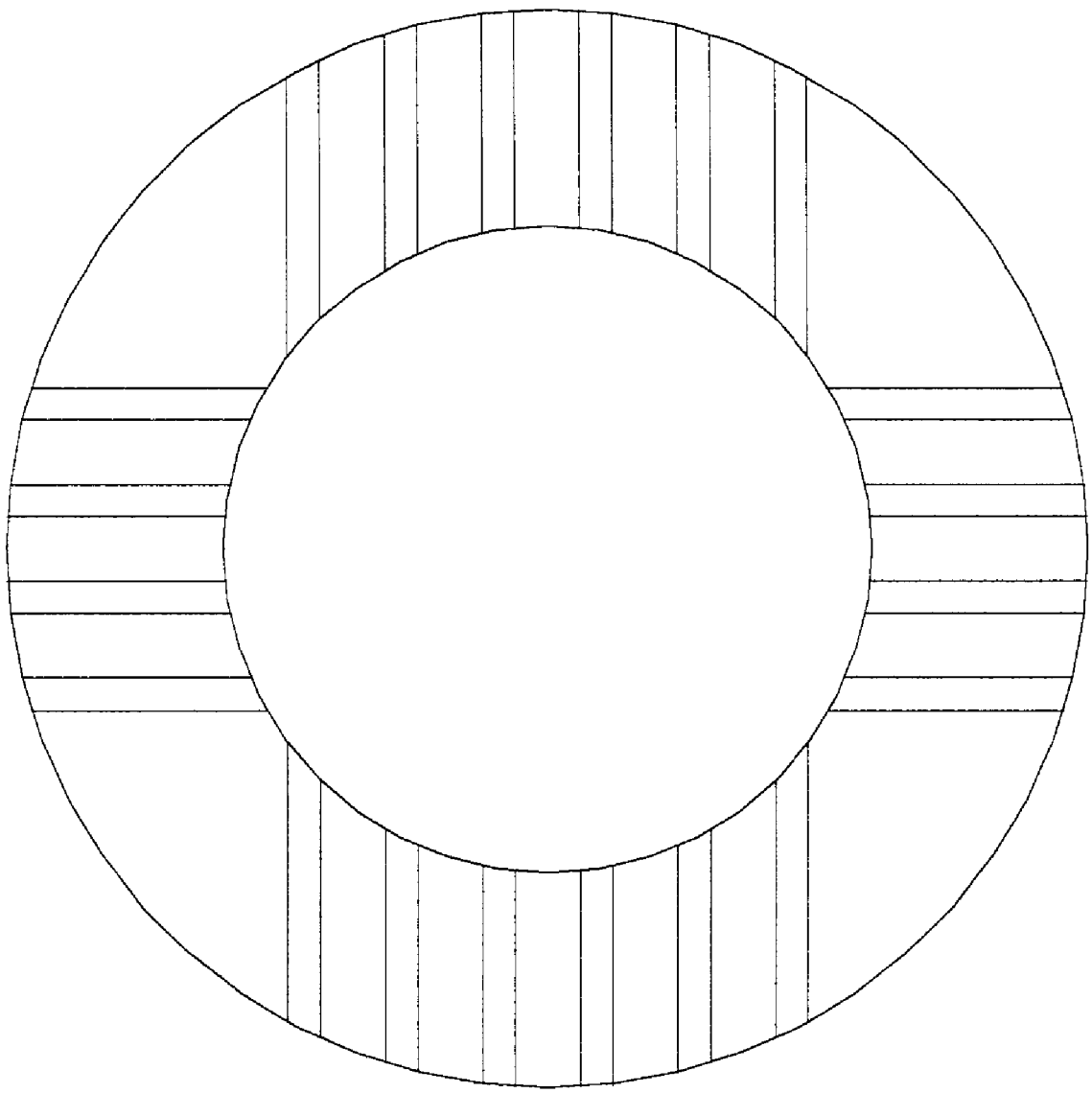
FIG. 15 is an elevational view of a friction surface in the prior art, and corresponds to FIG. 13.

Each of grooves 193 on the annular friction surfaces 141a and 142a on the friction surfaces 141 and 142 may have two bent portions as shown in FIG. 14.

The invention can be employed not only in the power cut-off clutch of the torque converter but also in a lock-up clutch. Further, the invention is not restricted to the torque converter, but may be employed in another clutch such as a wet multiple-disk clutch of a transmission.

In the friction member according to the invention, since the groove formed on the axial surface has the bent portion, the fluid cannot rapidly flow along the groove. Consequently, it is possible to prevent lowering of the pressure in the fluid flowing near the friction member.

Further, the present invention can provide the friction member assembly having the friction member described above. In addition, the present invention can provide the disk assembly having the friction member assembly described above. Preferably, the present invention can provide the torque converter having the disk assembly described above.

While only several embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A wet friction member adapted to be fixedly coupled to a friction plate of a wet clutch, comprising:
   a first annular surface facing in a first direction and adapted to be fixedly coupled to the friction plate;
   a second annular surface facing in a second direction that is opposite said first direction such that said first and second annular surfaces define an annular and flat one piece main body with a center opening; and
   a plurality of grooves formed on said second annular surface, said grooves extending from an inner periphery of said second annular surface to an outer periphery of said second annular surface, each of said grooves having a first groove portion extending inwardly from said outer periphery, a second groove portion extending outwardly from said inner periphery and a bent portion arranged between said first and second groove portions at a radially middle area of said second annular surface, each of said grooves being configured such that a straight radial flow path is not formed between said inner periphery and said outer periphery.

2. The wet friction member according to claim 1, wherein said grooves have an even number of bent portions.

3. The wet friction member according to claim 1, wherein said grooves have at least two bent portions.

4. The wet friction member according to claim 3, wherein each of said grooves has a third groove portion connecting said first and second groove portions together to form said bent portions where said first and second groove portions are connected to said third groove portion.

5. The wet friction member according to claim 4, wherein each of said grooves has a radially outer end of said first groove portion and a radially inner end of said second groove portion substantially located in the same circumferential position; and each of said grooves has a radially inner end of said first groove portion and a radially outer end of said second groove portion located in different circumferential positions.

6. A wet friction member according to claim 4, wherein said first and second groove portions of each of said grooves extend substantially in the radial direction from different circumferential positions, and said third groove portion of each of said grooves extends substantially in the circumferential direction.

7. A wet friction member according to claim 1, wherein each of said grooves has a V-shaped form.

8. The wet friction member according to claim 7, wherein said first portion of each of said V-shaped grooves has a radially outer end circumferentially offset from said bent portion in a rotational direction of said wet friction member; and said second portion of each of said V-shaped grooves has a radially inner end circumferentially offset from said bent portion in said rotational direction of said wet friction member.

9. A friction disk assembly adapted to be arranged in a fluid chamber filled with a fluid, comprising:

a friction plate adapted to rotate around a central axis within the fluid chamber, and said friction plate having a hub portion and an annular frictional coupling portion; and a first wet friction member fixedly coupled to an outer peripheral portion of said frictional coupling portion, said first wet friction member including a first annular surface, a second annular surface facing in an opposite direction of said first annular surface such that said first and second annular surfaces define an annular and flat one piece main body with a center opening, and a plurality of first grooves formed on said second annular surface, said first grooves extending from a first inner periphery of said second annular surface to a first outer periphery of said second annular surface, each of said first grooves having a first groove portion extending inwardly from said first outer periphery, a second groove portion extending outwardly from said first inner periphery and a bent portion arranged between said first and second groove portions at a radially middle area of said second annular surface each of said first grooves being configured such that a straight radial flow path is not formed between said first inner periphery and said first outer periphery.

10. A friction disk assembly according to claim 9, wherein said first grooves have an even number of bent portions.

11. A friction disk assembly according to claim 9, wherein said first grooves have at least two bent portions.

12. A friction disk assembly according to claim 11, wherein each of said first grooves has a third groove portion connecting said first and second groove portions together to form said bent portions where said first and second groove portions are connected to said third groove portion.

13. A friction disk assembly according to claim 12, wherein each of said first grooves has a radially outer end of said first groove portion and a radially inner end of said second groove portion substantially located in the same circumferential position; and each of said first grooves has a radially inner end of said first groove portion and a radially outer end of said second groove portion located in different circumferential positions.

14. A friction disk assembly according to claim 12, wherein said first and second groove portions of each of said first grooves extend substantially in the radial direction from different circumferential positions, and said third groove portion of each of said first grooves extends substantially in the circumferential direction.

15. A friction disk assembly according to claim 9, wherein each of said first grooves has a V-shaped form.

16. A friction disk assembly according to claim 9, further comprising:

a second wet friction member fixedly coupled to said outer peripheral portion of said friction plate on an opposite axial surface of said friction plate from said first wet friction member, said second wet friction member including a third annular surface, a fourth annular surface facing in an opposite direction of said third annular surface such that said third and fourth annular surfaces define an annular and flat main body with a center opening, and a plurality of second grooves formed on said fourth annular surface, said second grooves extending from a second inner periphery of said fourth annular surface to a second outer periphery of said fourth annular surface, each of said second grooves having a first groove portion extending inwardly from said second outer periphery, a second groove portion extending outwardly from said second inner periphery and a bent portion arranged between said first and second groove portions of said second grooves at a radially middle area of said fourth annular surface, each of said second grooves being configured such that a straight radial flow path is not formed between said second inner periphery and said second outer periphery.

17. A friction disk assembly according to claim 16, wherein said first and second grooves of said first and second wet friction members have an even number of bent portions.

18. A friction disk assembly according to claim 16, wherein said first and second grooves of said first and second wet friction members have at least two bent portions.

19. A friction disk assembly according to claim 18, wherein each of said first and second grooves of said first and second wet friction members has a third groove portion connecting said first and second groove portions together to form said bent portions where said first and second groove portions are connected to said third groove portion.

20. A friction disk assembly according to claim 19, wherein each of said first grooves has a radially outer end of said first groove portion and a radially inner end of said second groove portion substantially located in the same circumferential position;

each of said first grooves has a radially inner end of said first groove portion and a radially outer end of said second groove portion located in different circumferential positions;

each of said second grooves has a radially outer end of said first groove portion and a radially inner end of said second groove portion substantially located in the same circumferential position; and each of said second grooves has a radially inner end of said first groove portion and a radially outer end of said second groove portion located in different circumferential positions.

21. A friction disk assembly according to claim 19, wherein said first and second groove portions of each of said first grooves extend substantially in the radial direction from different circumferential positions, and said third groove portion of each of said first grooves extends substantially in the circumferential direction; and said first and second groove portions of each of said second grooves extend substantially in the radial direction from different circumferential positions and said third groove portion of each of said second grooves extends substantially in the circumferential direction.

22. A friction disk assembly according to claim 16, wherein each of said first and second grooves has a V-shaped form.

23. A clutch disk assembly adapted to be arranged in a fluid chamber filled with a fluid for transmitting a torque from an input rotary member to an output rotary member, comprising:

a pinching mechanism adapted to be coupled to one of the input and output rotary members;

a friction plate adapted to be coupled to the other one of said input and output rotary members to rotate around a central axis within the fluid chamber, and said friction plate having a hub portion, an annular frictional coupling portion and a first wet friction member, said first wet friction member including a first annular surface fixedly coupled to said annular frictional coupling portion, a second annular surface facing in an opposite direction of said first annular surface such that said first and second annular surfaces define an annular and flat one piece main body with a center opening, and a plurality of first grooves formed on said second annular surface, said first grooves extending from a first inner periphery of said second annular surface to a first outer periphery of said second annular surface, each of said first grooves having a first groove portion extending inwardly from said first outer periphery, a second groove portion extending outwardly from said first inner periphery and a bent portion arranged between said first and second groove portions at a radially middle area of said second annular surface, each of said first grooves being configured such that a straight radial flow path is not formed between said first inner periphery and said first outer periphery; and a control mechanism operatively coupled to said pinching mechanism for frictional coupling.

24. A clutch disk assembly according to claim 23, wherein said first grooves have an even number of bent portions.

25. A clutch disk assembly according to claim 23, wherein said first grooves have at least two bent portions.

26. A clutch disk assembly according to claim 25, wherein each of said first grooves has a third groove portion connecting said first and second groove portions together to form said bent portions where said first and second groove portions are connected to said third groove portion.

27. A clutch disk assembly according to claim 26, wherein each of said first grooves has a radially outer end of said first groove portion and a radially inner end of said second groove portion substantially located in the same circumferential position; and each of said first grooves has a radially inner end of said first groove portion and a radially outer end of said second groove portion located in different circumferential positions.

28. A clutch disk assembly according to claim 26, wherein said first and second groove portions of each of said first grooves extend substantially in the radial direction from different circumferential positions, and said third groove portion of each of said first grooves extends substantially in the circumferential direction.

29. A clutch disk assembly according to claim 23, wherein each of said first grooves has a V-shaped form.

30. A clutch disk assembly according to claim 23, further comprising:

a second wet friction member fixedly coupled to said outer peripheral portion of said friction plate on an opposite axial surface of said friction plate from said first wet friction member, said second wet friction member including a third annular surface, a fourth annular surface facing in an opposite direction of said third annular surface such that said third and fourth annular surfaces define an annular and flat main body with a center opening, and a plurality of second grooves formed on said fourth annular surface, said second grooves extending from a second inner periphery of said fourth annular surface to a second outer periphery of said fourth annular surface, each of said second grooves having a first groove portion extending inwardly from said second outer periphery, a second groove portion extending outwardly from said second inner periphery and a bent portion arranged between said first and second groove portions of said second grooves at a radially middle area of said fourth annular surface, each of said second grooves being configured such that a straight radial flow path is not formed between said second inner periphery and said second outer periphery.

31. A clutch disk assembly according to claim 30, wherein said first and second grooves of said first and second wet friction members have an even number of bent portions.

32. A clutch disk assembly according to claim 30, wherein said first and second grooves of said first and second wet friction members have at least two bent portions.

33. A clutch disk assembly according to claim 32, wherein each of said first and second grooves of said first and second wet friction members has a third groove portion connecting said first and second groove portions together to form said bent portions where said first and second groove portions are connected to said third groove portion.

34. A clutch disk assembly according to claim 33, wherein each of said first grooves has a radially outer end of said first groove portion and a radially inner end of said second groove portion substantially located in the same circumferential position;

each of said first grooves has a radially inner end of said first groove portion and a radially outer end of said second groove portion located in different circumferential positions;

each of said second grooves has a radially outer end of said first groove portion and a radially inner end of said second groove portion substantially located in the same circumferential position; and each of said second grooves has a radially inner end of said first groove portion and a radially outer end of said second groove portion located in different circumferential positions.

35. A clutch disk assembly according to claim 33, wherein said first and second groove portions of each of said first grooves extend substantially in the radial direction from different circumferential positions, and said third groove portion of each of said first grooves extends substantially in the circumferential direction; and said first and second groove portions of each of said second grooves extend substantially in the radial direction from different circumferential positions, and said third groove portion of each of said second grooves extends substantially in the circumferential direction.

36. A clutch disk assembly according to claim 30, wherein each of said first and second grooves has a V-shaped form.

37. A torque converter for transmitting a torque from an input rotary member to an output rotary member, comprising:

a front cover supplied with a torque from said input rotary member;

an impeller arranged on said output rotary member side of said front cover, and forming a fluid chamber together with said front cover;

a turbine arranged opposite said impeller within said fluid chamber, said turbine forming a fluid operation chamber together with said impeller;

a stator arranged radially inside with respect to said impeller and said turbine for regulating a flow of fluid from said turbine to said impeller; and a disk assembly axially arranged in said fluid chamber between said front cover and said turbine, said disk assembly being coupled between said turbine and one of said front cover and the output rotary member, said disk assembly comprising a pinching mechanism and a friction plate, said friction plate having a hub portion, an annular frictional coupling portion and a first wet friction member, said first wet friction member including
  a first annular surface fixedly coupled to said annular frictional coupling portion,
  a second annular surface facing in an opposite direction of said first annular surface such that said first and second annular surfaces define an annular and flat one piece main body with a center opening, and
  a plurality of first grooves formed on said second annular surface, said first grooves extending from a first inner periphery of said second annular surface to a first outer periphery of said second annular surface, each of said first grooves having a first groove portion extending inwardly from said first outer periphery, a second groove portion extending outwardly from said first inner periphery and a bent portion arranged between said first and second groove portions at a radially middle area of said second annular surface, each of said first grooves being configured such that a straight radial flow path is not formed between said first inner periphery and said first outer periphery; and a control mechanism operatively coupled to said pinching mechanism for frictional coupling.

38. A torque converter according to claim 37, wherein said disk assembly is part of a power cut-off clutch that is adapted to transmit and interrupt the torque from said turbine to the output rotary member, said pinching mechanism is coupled to said turbine; and said friction plate is coupled to the output rotary member.

39. A torque converter according to claim 37, wherein said disk assembly is part of a lock-up mechanism that is adapted to directly transmit torque from said front cover to said turbine, said pinching mechanism is coupled to said turbine; and said friction plate is located between said front cover and said pinching mechanism.

40. A torque converter according to claim 37, wherein said first grooves have at least two bent portions.

41. A torque converter according to claim 40, wherein each of said first grooves has a third groove portion connecting said first and second groove portions together to form said bent portions where said first and second groove portions are connected to said third groove portion.

42. A torque converter according to claim 41, wherein each of said first grooves has a radially outer end of said first groove portion and a radially inner end of said second groove portion substantially located in the same circumferential position; and each of said first grooves has a radially inner end of said first groove portion and a radially outer end of said second groove portion located in different circumferential positions.

43. A torque converter according to claim 41, wherein said first and second groove portions of each of said first grooves extend substantially in the radial direction from different circumferential positions, and said third groove portion of each of said first grooves extends substantially in the circumferential direction.

44. A torque converter according to claim 39, wherein each of said first grooves has a V-shaped form.

45. A torque converter according to claim 39, further comprising:

a second wet friction member fixedly coupled to said outer peripheral portion of said friction plate on an opposite axial surface of said friction plate from said first wet friction member, said second wet friction member including
  a third annular surface,
  a fourth annular surface facing in an opposite direction of said third annular surface such that said third and fourth annular surfaces define an annular and flat main body with a center opening, and
  a plurality of second grooves formed on said fourth annular surface, said second grooves extending from a second inner periphery of said fourth annular surface to a second outer periphery of said fourth annular surface, each of said second grooves having a first groove portion extending inwardly from said second outer periphery, a second groove portion extending outwardly from said second inner periphery and a bent portion arranged between said first and second groove portions of said second grooves at a radially middle area of said fourth annular surface, each of said second grooves being configured such that a straight radial flow path is not formed between said second inner periphery and said second outer periphery.

46. A torque converter according to claim 45, wherein said first and second grooves of said first and second wet friction members have at least two bent portions.

47. A torque converter according to claim 46, wherein each of said first and second grooves of said first and second wet friction members has a third groove portion connecting said first and second groove portions together to form said bent portions where said first and second groove portions are connected to said third groove portion.

48. A torque converter according to claim 47, wherein each of said first grooves has a radially outer end of said first groove portion and a radially inner end of said second groove portion substantially located in the same circumferential position;

each of said first grooves has a radially inner end of said first groove portion and a radially outer end of said second groove portion located in different circumferential positions;

each of said second grooves has a radially outer end of said first groove portion and a radially inner end of said second groove portion substantially located in the same circumferential position; and each of said second grooves has a radially inner end of said first groove portion and a radially outer end of said second groove portion located in different circumferential positions.

49. A torque converter according to claim 47, wherein said first and second groove portions of each of said first grooves extend substantially in the radial direction from different circumferential positions, and said third groove portion of each of said first grooves extends substantially in the circumferential direction; and said first and second groove portions of each of said second grooves extend substantially in the radial direction from different circumferential positions, and said third groove portion of each of said second grooves extends substantially in the circumferential direction.

50. A torque converter according to claim 45, wherein each of said first and second grooves has a V-shaped form.

51. A wet friction member adapted to be fixedly coupled to a friction plate of a wet clutch, comprising:

a first annular surface facing in a first direction and adapted to be fixedly coupled to the friction plate;

a second annular surface facing in a second direction that is opposite said first direction such that said first and second annular surfaces define an annular and flat one piece main body with a center opening; and a plurality of grooves formed on said second annular surface, each of said grooves having first and second walls extending from an inner periphery of said second annular surface to an outer periphery of said second annular surface, each of said first walls being formed with a first radially inner end and a first radially outer end with a first apex therebetween, each of said second walls being formed with a second radially inner end and a second radially outer end with a second apex therebetween, said first radially inner and outer ends being circumferentially spaced in a first circumferential direction from said first apex, said second radially inner and outer ends being circumferentially spaced in said first circumferential direction from said second apex to form a bent groove portion at a radially middle area of said wet friction member.

52. The wet friction member according to claim 51, wherein said first and second walls are equally spaced from each other.

* * * * *